(12) United States Patent
Cassoni

(10) Patent No.: US 9,759,598 B2
(45) Date of Patent: Sep. 12, 2017

(54) CHECKWEIGHER ASSEMBLY AND METHOD OF WEIGHING AN OBJECT

(71) Applicant: The Procter & Gamble Company, Cincinnati, OH (US)

(72) Inventor: Robert Paul Cassoni, Washington Township, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 122 days.

(21) Appl. No.: 14/590,034

(22) Filed: Jan. 6, 2015

(65) Prior Publication Data
US 2016/0195423 A1 Jul. 7, 2016

(51) Int. Cl.
| | | |
|---|---|---|
| *G01G 15/00* | (2006.01) | |
| *B65B 1/46* | (2006.01) | |
| *B67C 3/20* | (2006.01) | |

(52) U.S. Cl.
CPC ............. *G01G 15/00* (2013.01); *B65B 1/46* (2013.01); *G01G 15/006* (2013.01); *B67C 3/202* (2013.01)

(58) Field of Classification Search
CPC ...... G01G 15/00; G01G 15/006; B67C 3/202; B67C 3/242; B65B 1/46
USPC .......................................................... 141/83
See application file for complete search history.

(56) References Cited

U.S. PATENT DOCUMENTS

| | | | | |
|---|---|---|---|---|
| 2,462,375 A | * | 2/1949 | Flaherty ................... | A47F 5/08 211/75 |
| 2,987,313 A | * | 6/1961 | Bjering .................. | B67B 3/2033 269/14 |
| 3,875,725 A | * | 4/1975 | Carmichael ............... | B65B 7/28 53/300 |
| 5,732,528 A | * | 3/1998 | Peronek .................. | B65B 43/60 53/201 |
| 5,778,633 A | * | 7/1998 | Sweeny .................. | B65B 43/60 53/201 |
| 7,278,451 B2 | * | 10/2007 | Cavallari ................ | B67C 3/242 141/152 |

(Continued)

FOREIGN PATENT DOCUMENTS

| | | |
|---|---|---|
| JP | 2011079567 A1 | 4/2011 |
| JP | 2013230836 A | 11/2013 |

(Continued)

*Primary Examiner* — Randy Gibson
(74) *Attorney, Agent, or Firm* — Lauren Christine Gonzalez; Abbey A. Lopez; Gary J. Foose

(57) ABSTRACT

A checkweigher assembly includes a frame that is rotatable about an axis of rotation, a scale operatively connected with the frame, and a holder member operatively connected with the scale. The holder member is substantially supported by the scale. The holder member includes first and second grip members, each having an outer surface. The outer surfaces of the first and second grip members are arranged in a face-to-face relationship and are axially spaced apart by a gap. The first grip member is movable from a first position to a second position. The gap is defined by a first minimum length when the first grip member is in the first position and a second minimum length when the first grip member is in the second position, wherein first minimum length is greater than the second minimum length. A method of weighing objects with the checkweigher assembly is provided.

20 Claims, 17 Drawing Sheets

(56) References Cited

U.S. PATENT DOCUMENTS

| | | | |
|---|---|---|---|
| 8,590,277 B2* | 11/2013 | Baroni | B67B 3/2033 |
| | | | 53/300 |
| 8,684,162 B2 | 4/2014 | Cavina | |
| 9,120,665 B1* | 9/2015 | Fogg | B67C 3/242 |
| 9,388,036 B2* | 7/2016 | Fogg | B67D 7/84 |
| 2010/0000628 A1* | 1/2010 | Neumayer | B67C 3/202 |
| | | | 141/83 |
| 2011/0000578 A1 | 1/2011 | Krulitsch et al. | |
| 2013/0306190 A1 | 11/2013 | Tanaka et al. | |
| 2014/0096863 A1 | 4/2014 | Hermann et al. | |
| 2015/0047299 A1 | 2/2015 | John-Unterburger et al. | |

FOREIGN PATENT DOCUMENTS

| | | | |
|---|---|---|---|
| WO | WO 2009/016499 A2 | 2/2009 | |
| WO | 2013185944 A1 | 12/2013 | |

* cited by examiner

CHECKWEIGHER ASSEMBLY AND METHOD OF WEIGHING AN OBJECT

FIELD OF THE INVENTION

The present disclosure is directed to an apparatus and method for weighing an object, and, more particularly, to a checkweigher assembly and method for weighing an object.

BACKGROUND OF THE INVENTION

A manufacturing process for packaging consumer goods, for example, may include a checkweigher apparatus for measuring the weight of a container, either before or after the container is filled with product, for quality control purposes. The checkweigher apparatus may be positioned downstream from a product filling apparatus in order to verify that the container was filled with a desired amount of product, or within a certain acceptable weight margin. Checkweigher apparatuses are often configured with a static scale and a linear conveyor that advances the container over the static scale. A problem associated with such checkweigher apparatuses having a linear conveyor is that the container tends to be unstable as the container advances on the conveyor over the scale. As a result, the weight can be inaccurate. Moreover, in order to increase the stability of the container, the speed at which the container advances in the machine direction may have to be reduced. Additionally, the conveyor length has to be sufficiently long to provide enough time for the scale to take a measurement of the containers weight. Another way to ensure that the container is advanced over the scale for a sufficient amount of time to take a weight measurement is to reduce the surface velocity of the advancing container. Consequently, linear conveyor checkweigher apparatuses often have a relatively large foot print and/or a relatively low throughput rate. For example, linear conveyor checkweigher apparatuses may have a maximum throughput rate of 250 to 300 goods per minute.

In some manufacturing processes, containers are filled on a filling apparatus. Some filling apparatuses comprise scales for weighing the container as the container is filled with product in order to precisely control the amount of product packaged in the container. Such filling apparatus having scales may be configured as a rotary star wheel apparatus that have individual platforms for receiving a container. Such filling apparatus often include a relatively larger number of platforms, upwards of 40 to 50 platforms. Such filling apparatuses include such a large number of platforms in order for the dwell time that the container advances on the platform is sufficiently long for the container to be filled with product. In such a filling apparatus, each platform would be associated with a separate scale. However, one problem associated with a filling apparatus having scales associated with each platform is that 40 to 50 scales can add significant cost to the filling apparatus. Moreover, in some filling processes, such precise control over the amount of product filled into the container is unnecessary.

However, a problem associated with using rotary apparatuses for advancing containers involves gripper mechanisms that may be used to hold the container in place as the apparatus rotates. Such a gripper mechanism may be configured to hold the sidewalls of the container in order to restrict movement of the container as the container is rotated on the apparatus. Such gripper mechanisms may be designed to match the shape and/or size of the container in order to restrict movement of the container. As a result, if a single manufacturing production line is used to produce products having different containers, separate gripper mechanisms will be needed for each container design. Consequently, this can add time to the changeover process and additional costs to the manufacturing line. Another downside of using gripper mechanisms to hold the sidewall(s) of the container is that the gripper mechanism can apply too much pressure to the sidewall(s) of the container, resulting in temporary or permanent deformation to the container. In addition, the gripper mechanisms can decrease the accuracy of the weight measurement of the container because some of the weight of the container may be transferred from the scale to the gripper mechanism, or the weight of the gripper mechanism can be transferred to the scale.

As a result, it would be beneficial to provide a checkweigher apparatus that provides a minimal footprint and that is capable of handling containers of different sizes and shapes. It would also be beneficial to provide a checkweigher apparatus that positively controls the position of a container as the container is being weighed without deforming the container or affecting the accuracy of the weight measurement. It would also be beneficial to provide a checkweigher apparatus that provides a high throughput rate while limiting the number of scales needed in a single production line.

SUMMARY OF THE INVENTION

Aspects of the present disclosure include a method of weighing an object on a checkweigher assembly. The checkweigher assembly comprises a frame that is rotatable about an axis of rotation and a scale operatively connected with the frame. The checkweigher assembly further comprises top and bottom grip members, wherein the top and bottom grip members are axially spaced apart from each other and are operatively connected with and substantially supported by the scale. The top and bottom grip members each have an outer surface, wherein the outer surfaces of the top and bottom grip members are arranged in a face-to-face relationship and form a gap therebetween defined by a length. The length of the gap is adjustable. The method comprises the steps of: advancing an object in a machine direction, the object having a top periphery surface and a bottom periphery surface, wherein the object is defined by a height extending from an outermost point of the top periphery surface to an outermost point of the bottom periphery surface; rotating the frame of the checkweigher assembly in a machine direction about the axis of rotation; configuring the gap between the outer surfaces of the top and bottom grip members to a first length that is greater than the height of the object; positioning the bottom periphery surface of the object on the outer surface of the bottom grip member; adjusting the gap between the outer surfaces of the top and bottom grip members until the top and bottom grip members contact the object; weighing the object; adjusting the gap between the outer surfaces of the top and bottom grip members to a second length that is greater than the height of the object; and removing the object from the bottom grip member.

Aspects of the present disclosure also include a method of weighing an object having a variable height on a checkweigher assembly. The checkweigher assembly comprises a frame that is rotatable about an axis of rotation, a scale operatively connected with the frame, and first and second grip members operatively connected with the frame. The first and second grip members are substantially supported by scale. The method comprises the steps of: providing an object having a top periphery surface and a bottom periphery surface; rotating the frame in a machine direction about an axis of rotation; positioning the object on the second grip member; applying pressure to the object in an axially downward direction using the first grip member; weighing the object using the scale as the frame rotates about the axis of rotation; and removing the object from the second grip member.

Aspects of the present disclosure also include a checkweigher assembly capable of simultaneously weighing one or more objects. The checkweigher assembly comprises a frame rotatable about an axis of rotation; a scale operatively connected with the frame; and a holder member operatively connected with the scale. The weight of the holder member is substantially supported by the scale. The holder member comprises a first grip member having an outer surface and a second grip member having an outer surface, wherein the first grip member is axially spaced from the second grip member forming a gap therebetween. The outer surface of the first grip member is in a face-to-face relationship with the outer surface of the second grip member. The first grip member is movable from a first position to a second position, wherein the gap is defined by a first minimum length when the first grip member is in the first position, wherein the gap is defined by a second minimum length when the first grip member is in the second position, wherein the first minimum length is greater than the second minimum length.

DETAILED DESCRIPTION

Figure 1:
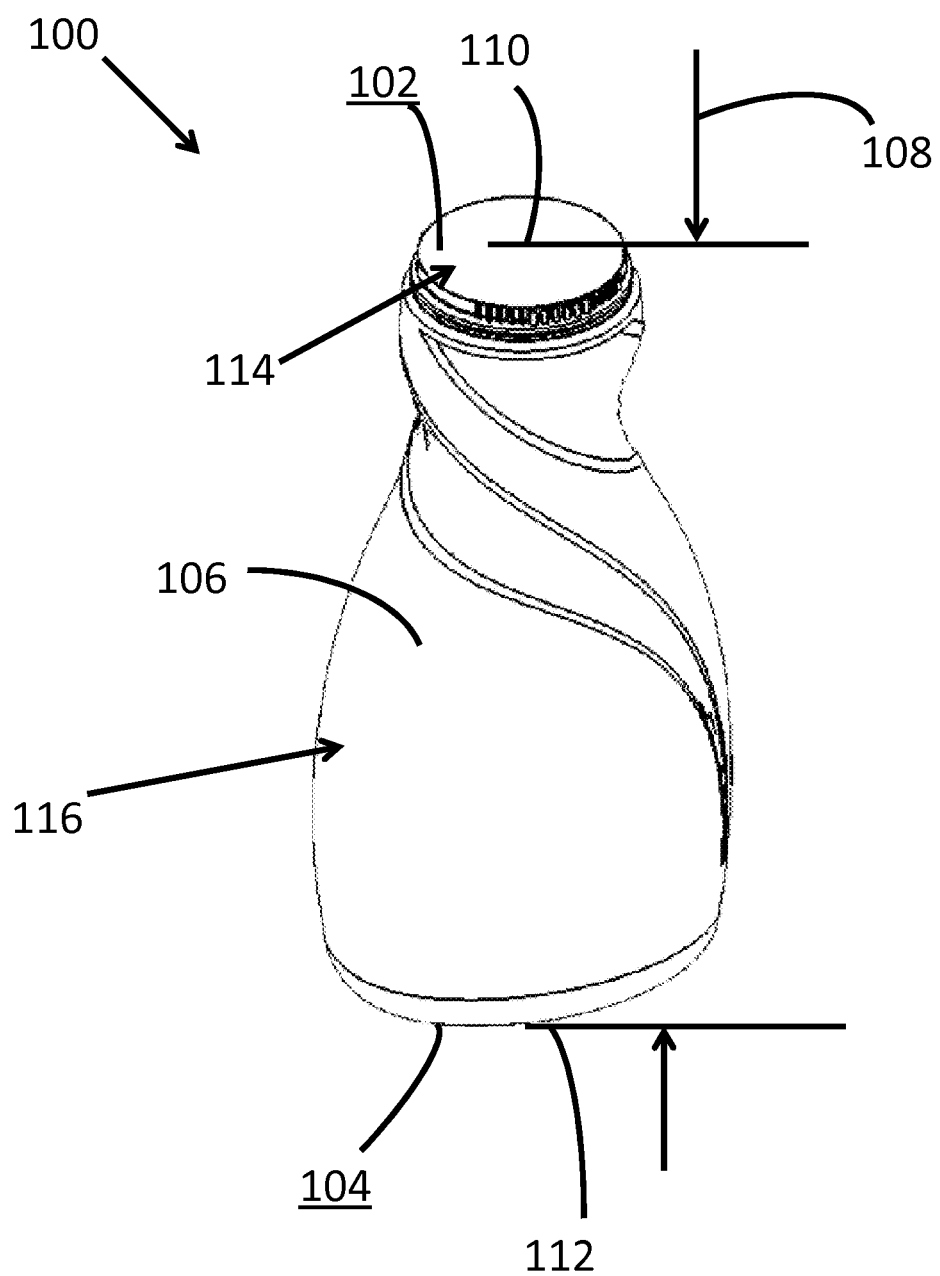
FIG. 1 is a top, perspective view of an exemplary container that may be weighed using the checkweigher assembly of the present disclosure.

Various non-limiting exemplary configurations of the present disclosure will now be described to provide an overall understanding of the principles of the structure, function, manufacture, and use of the checkweigher assembly disclosed herein. One or more examples of these non-limiting exemplary configurations are illustrated in the accompanying drawings. Those of ordinary skill in the art will understand that the checkweigher assembly described herein and illustrated in the accompanying drawings are non-limiting example configurations and that the scope of the various non-limiting configurations of the present disclosure are defined solely by the claims. The features illustrated or described in connection with one non-limiting exemplary configuration may be combined with the features of other non-limiting exemplary configurations. Such modifications and variations are intended to be included within the scope of the present disclosure.

The present disclosure includes checkweigher assemblies that may be used to weigh objects, such as containers, during a manufacturing process. The present disclosure also includes methods for weighing objects in a manufacturing process. For example, the checkweigher assembly may be used to weigh an advancing container subsequent to the container being filled with a product in order to verify that the level of product in the container is within acceptable limits. However, it is to be appreciated that the checkweigher assembly of the present disclosure may be used to weigh containers in various stages of a manufacturing process. Moreover, some manufacturing processes may use the checkweigher assembly to weigh empty containers. The checkweigher assembly may occupy a relatively small footprint. While the present disclosure discusses the checkweigher assembly as being capable of weighing containers, it is to be appreciated that the checkweigher assembly of the present disclosure may be used to weigh various different objects, such as consumer products, either disposed in a container or independent of a container.

Containers of various sizes and shapes may be weighed with the checkweigher assembly of the present disclosure. An exemplary container includes a top periphery surface and an opposing bottom periphery surface separated by a sidewall or sidewalls. The container can be defined by a height that extends from an outermost point of the top periphery surface to an outermost point of the bottom periphery surface. The containers may be used to contain various products, including products in various forms and for various purposes. For example, the container may be used to contain liquid compositions such as cleaning and/or personal care compositions. However, it is to be appreciated that the product may include various compositions in various other forms, including solid, powder, granule, liquid, gel, emulsion, or the like.

The checkweigher assembly may be used to weigh containers of different dimensions. For example, the containers may have a height in the range of about 100 millimeters (mm) to about 350 mm. The reservoir may have a maximum width of about 30 mm to about 150 mm. Moreover, the containers may have a maximum depth of about 30 mm to about 150 mm. The containers may be configured to hold various amounts of composition. For example, the containers may have a volume of about 100 milliliters to about 2000 milliliters. The checkweigher assembly may be configured to weigh containers of various different weights. For example, the weight of the container may be in the range of about 50 grams to about 10 kg, or in the range of about 100 grams to about 3 kg. The container may include one or more separate portions, such as a lid and a reservoir enclosed by the lid. In other exemplary configurations, the container may include only a reservoir or may be unitary structure. The container, including the lid and/or the reservoir, may be composed of various rigid or semi-rigid materials, including high density polyethylene, polypropylene, polyethylene terephthalate, and thermoplastic elastomers. The lid and the reservoir may be composed of the same material, or the lid and the reservoir may be composed of different materials.

The checkweigher assembly may include a frame that is rotatable about an axis of rotation and at least one weigh station connected with the frame. Each weigh station includes a scale and a holder member operatively connected with the scale. The holder member is substantially supported by the scale in order to maximize the accuracy of the weight measurement. The holder member includes two grip members, a first and a second grip member. The first and second grip members each have an outer surface, wherein the outer surfaces of the first and second grip members are in a face-to-face relationship and the outer surfaces of the grip members are axially spaced apart by a gap that extends parallel with the axis of rotation. The gap may be defined by a minimum length. At least one of the grip members is movable in the axial direction in order to adjust the length of the gap between the outer surfaces of the grip members.

The holder member may be fully supported by the scale.

The checkweigher assembly may be configured as a rotary checkweigher assembly. The checkweigher assembly may be configured in other ways as well. For example, the rotary checkweigher assembly may be configured as a rectangular, arcuate, or any other shape closed-path conveyor system.

The holder member is configured to receive a container. More specifically, the holder member is configured to receive a container and hold the container with the first and second grip members as the frame rotates the weigh station about the axis of rotation. The container is held by the first and second grip members by applying an axially downward pressure onto the container with one of the grip members. As such, the container is kept stable relative to the weigh station so that the scale can quickly and accurately measure the weight of the container. Moreover, the container may be more able to resist deformation by forces applied in an axially downward direction as compared with forces applied to the container in a radial direction that is perpendicular to the axis of rotation, thereby minimizing potential deformation to the container as the weigh station measures the weight of the container.

A first grip member may be movable in the axial direction relative to the second grip member. The first grip member may be movable from a first position to a second position. With the first grip member in a first position, the gap between the outer surfaces of the first and second grip members may be defined by a first minimum length. With the first grip member in a second position, the gap between the outer surfaces of the first and second grip members may be defined by a second minimum length, wherein the first minimum length is different from the second minimum length. The first minimum length may be greater than the second minimum length.

The first grip member may also be movable to a third position. With the first grip member in a third position, the gap between the outer surfaces of the first and second grip member may be defined by a third minimum distance that is different from the first and/or second minimum distances.

The second grip member may be stationary relative to the first grip member.

The second grip member may be movable relative to the first grip member. The first and second grip members may both be movable relative to each other. Or, the second grip member may be movable relative to the first grip member and the first grip member may be stationary relative to the second grip member.

The first grip member may be configured as a top grip member and the second grip member may be configured as a bottom grip member.

The holder member may include variety of mechanisms for adjusting the axial position of the first and/or second grip members. For example, the holder member may include a cam. The cam may be operatively connected with the first and/or second grip member. The cam may be configured to axially move the first and/or second grip members. The cam may include a cam plate having an outer surface. The cam may include a roller. The cam may include a cam follower. The roller may be configured to engage with the cam plate and circumnavigate on the cam plate about the axis of rotation. As the roller circumnavigates on the cam plate, the roller and the cam follower may change axial position in correspondence with the axial position of the outer surface of the cam plate. The cam follower may be operatively connected with the first and/or second grip member such that as the cam follower changes axial position, the first and/or second grip member also changes axial position.

The holder member may also include a spring. The spring may be configured to apply a predetermined amount of pressure onto the container in an axially downward direction in order to restrict movement of the container as the frame rotates about the axis of rotation.

In another example, the holder member may include an electric actuator to adjust the axial position of the first and/or second grip member. The electric actuator may be operatively connected with the first and/or second grip members and may be configured to axially move the first and/or second grip member. The electric actuator may be configured to apply a predetermined amount of pressure to the container at the top periphery surface of the container in an axial direction.

The checkweigher assembly may include a plurality of weigh stations spaced circumferentially about the axis of rotation of the checkweigher assembly. For example, the checkweigher assembly may include 15 or fewer weigh stations. In another example, the checkweigher assembly may include 12 or fewer weigh stations.

In operation, the frame of the checkweigher assembly may be rotated in a machine direction about the axis of rotation. The frame may be continuously rotated. The gap between the outer surfaces of the first and second grip members may be adjusted to a first minimum length that is greater than the height of the container to be weighed on the weigh assembly. As the frame continues to rotate, the bottom periphery surface of the container may be positioned on the outer surface of the second grip member. Next, the gap between the outer surfaces of the first and second grip members may be adjusted to a second minimum length that is substantially equal to the height of the container. Pressure may be applied to the container in an axially downward direction by the first and second grip members. While the first and second grip members hold the container, the weight of the container may be measured with the scale. Then, the gap between the outer surfaces of the first and second grip members may be adjusted to a third minimum length that is greater than the height of the container. Finally, the container may be removed from the second grip member.

Figure 2:
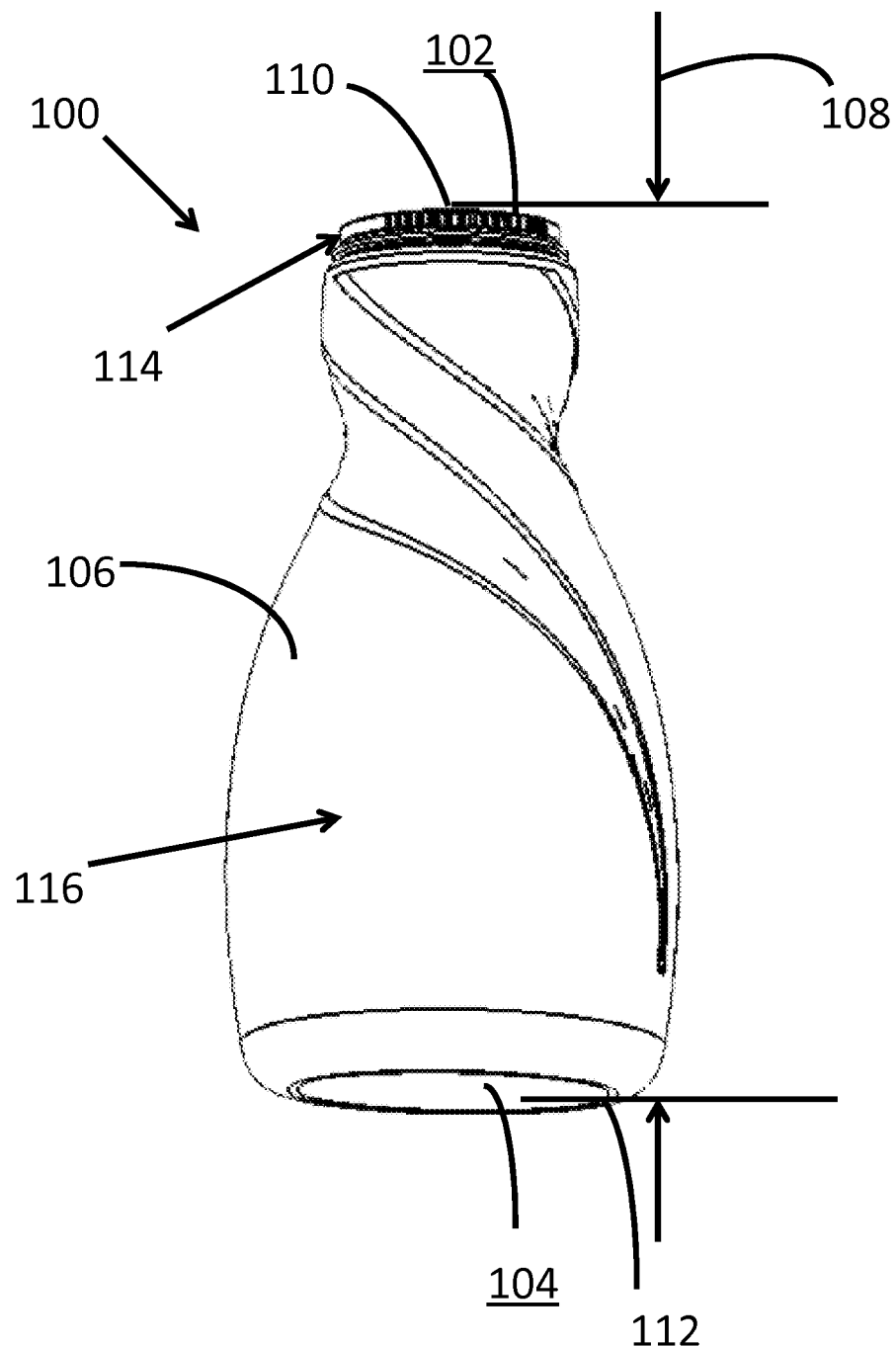
FIG. 2 is a bottom, perspective view of an exemplary container that may be weighed using the checkweigher assembly of the present disclosure.

FIGS. 1 and 2 illustrate an exemplary container 100 that may be weighed by a checkweigher assembly of the present disclosure. The container 100 may be defined by a top periphery surface 102 and a bottom periphery surface 104. The top and/or bottom periphery surfaces 102 and 104 may be flat, substantially flat, curved, or may have a curvilinear surface. The container 100 may include one or more sidewalls 106 separating the top and bottom periphery surfaces 102 and 104. A distance between an outermost point 110 of the top periphery surface 102 and an outermost point 112 of the bottom periphery surface 104 defines a height 108 of the container 100. As shown in FIGS. 1 and 2, the container 100 may include two separate portions, such as a lid 114 and a reservoir 116 enclosed by the lid 114. In other exemplary configurations, the container may include only a reservoir or may be unitary structure.

Figure 3:
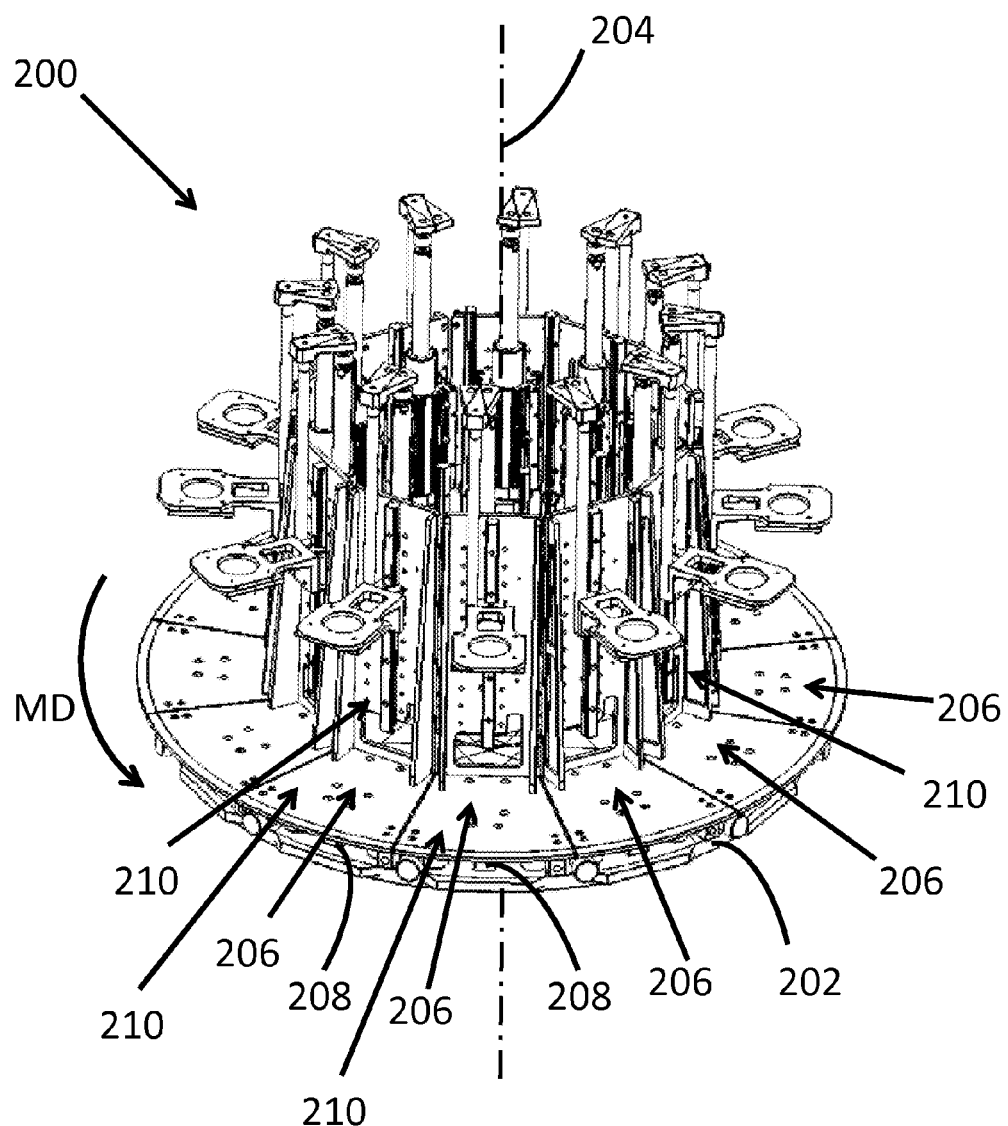
FIG. 3 is a top, perspective view of an exemplary checkweigher assembly having a plurality of weigh stations spaced circumferentially about an axis of rotation of the checkweigher assembly.
Figure 4:
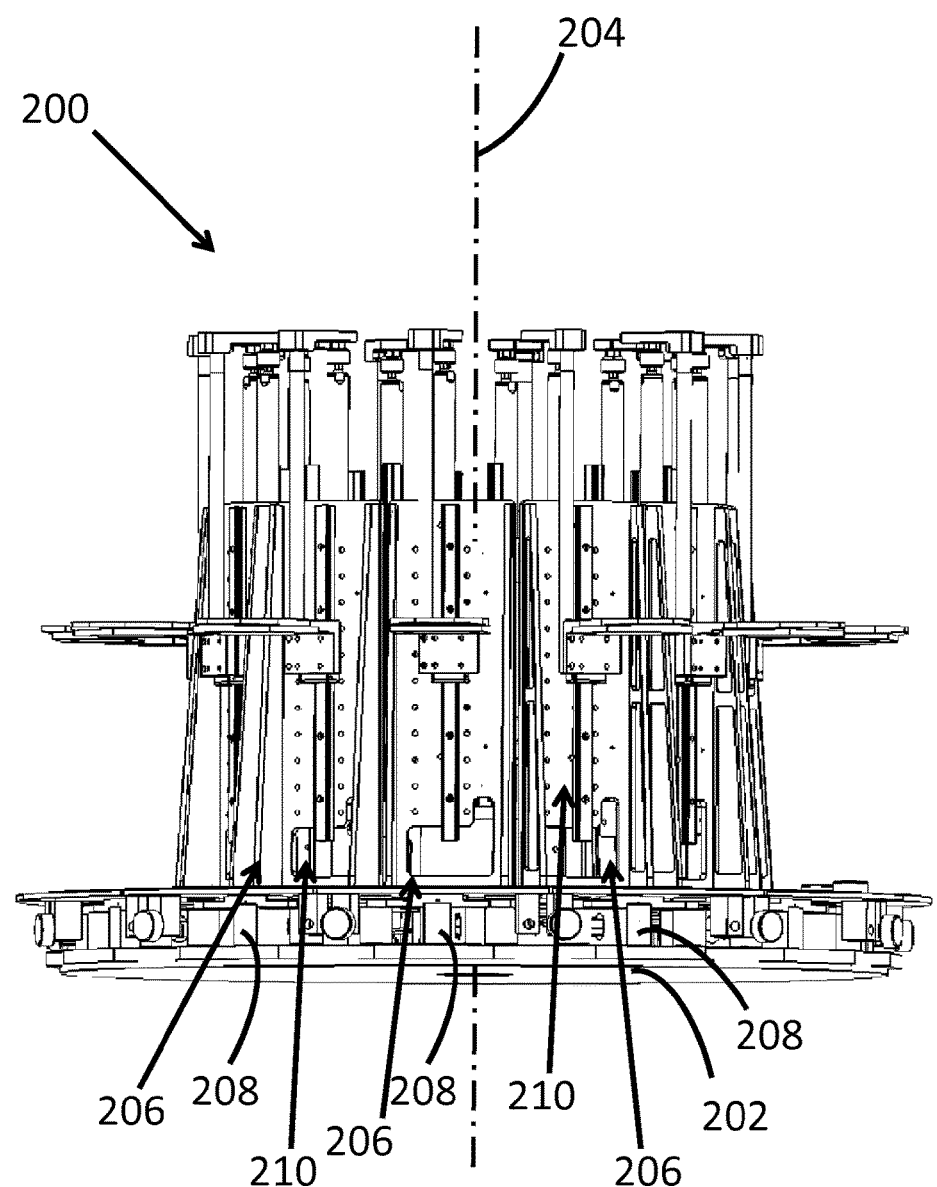
FIG. 4 is a side, elevation view of an exemplary checkweigher assembly.
Figure 5:
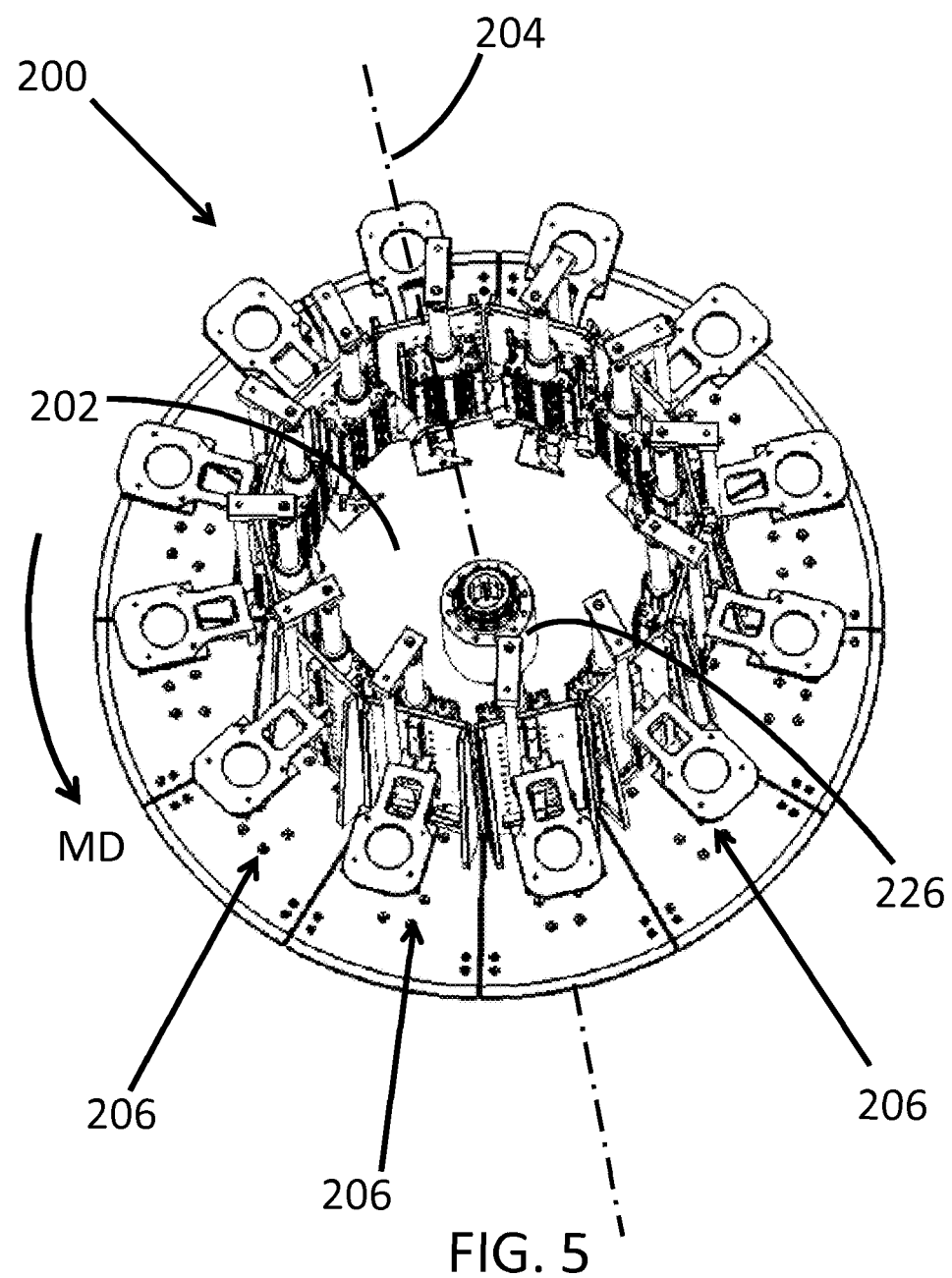
FIG. 5 is a top, perspective view of an exemplary checkweigher assembly.

With reference to FIGS. 3-5, a checkweigher assembly 200 may include a frame 202 that is rotatable about an axis of rotation 204 and at least one weigh station 206. The weigh station 206 includes a scale 208 connected with the frame 202 and a holder member 210 connected with the scale 208. The checkweigher assembly 200 may include a plurality of weigh stations 206 disposed circumferentially about the axis of rotation 204, with each weigh station 206 having a scale 208 connected with the frame 202 and a holder member 210 connected with the scale 208. As shown in FIGS. 3-5 for illustrative purposes only, the checkweigher assembly 200 may include twelve weigh stations 206.

With reference to FIGS. 3-5, the holder member 210 may be substantially supported by the scale 208. The holder member 210 may also be fully supported by the scale 208.

With reference to FIG. 5, the frame 202 may be configured to rotate about a drive shaft 226. A drive mechanism may be used to rotate the drive shaft 226 about the axis of rotation 204. The drive mechanism may include a drive belt or drive chain, for example. It is to be appreciated that various other drive mechanisms may be used to rotate the drive shaft 226 about the axis of rotation 204. The drive mechanism may cause the drive shaft 226 to rotate either clockwise or counter clockwise about the axis of rotation 204, which in turn causes the frame 202 to rotate either clockwise or counter clockwise about the axis of rotation 204. The drive shaft 226 may rotate in either direction at any speed about the axis of rotation to rotate the frame 202 about the axis of rotation 226.

The checkweigher assembly 200 shown in FIGS. 3-5 is configured as a rotary checkweigher assembly. However, it is to be appreciated that the checkweigher assembly of the present disclosure may be configured in various different ways. For example, the checkweigher assembly may be configured as a rectangular, arcuate, or any other shape closed-path conveyor system that has at least one weigh station. In such a configuration, the weigh stations may be connected with the frame of the assembly or with a conveyor system of the assembly that advances the weigh station(s) in a machine direction about a closed path. The frame or conveyor system may move the weigh station(s) in the machine direction about a central axis.

As discussed above, one problem with existing checkweigher assemblies that are configured with a linear conveyor is that the linear conveyor consumes a large footprint. Configuring the checkweigher assembly as a checkweigher assembly solves this problem. The small footprint of the checkweigher assembly is at least partially attributed to the round shape of the checkweigher assembly. Moreover, configuring the checkweigher assembly with more than one weigh assembly allows for a fast throughput rate in a relatively small and compact footprint.

Figure 6:
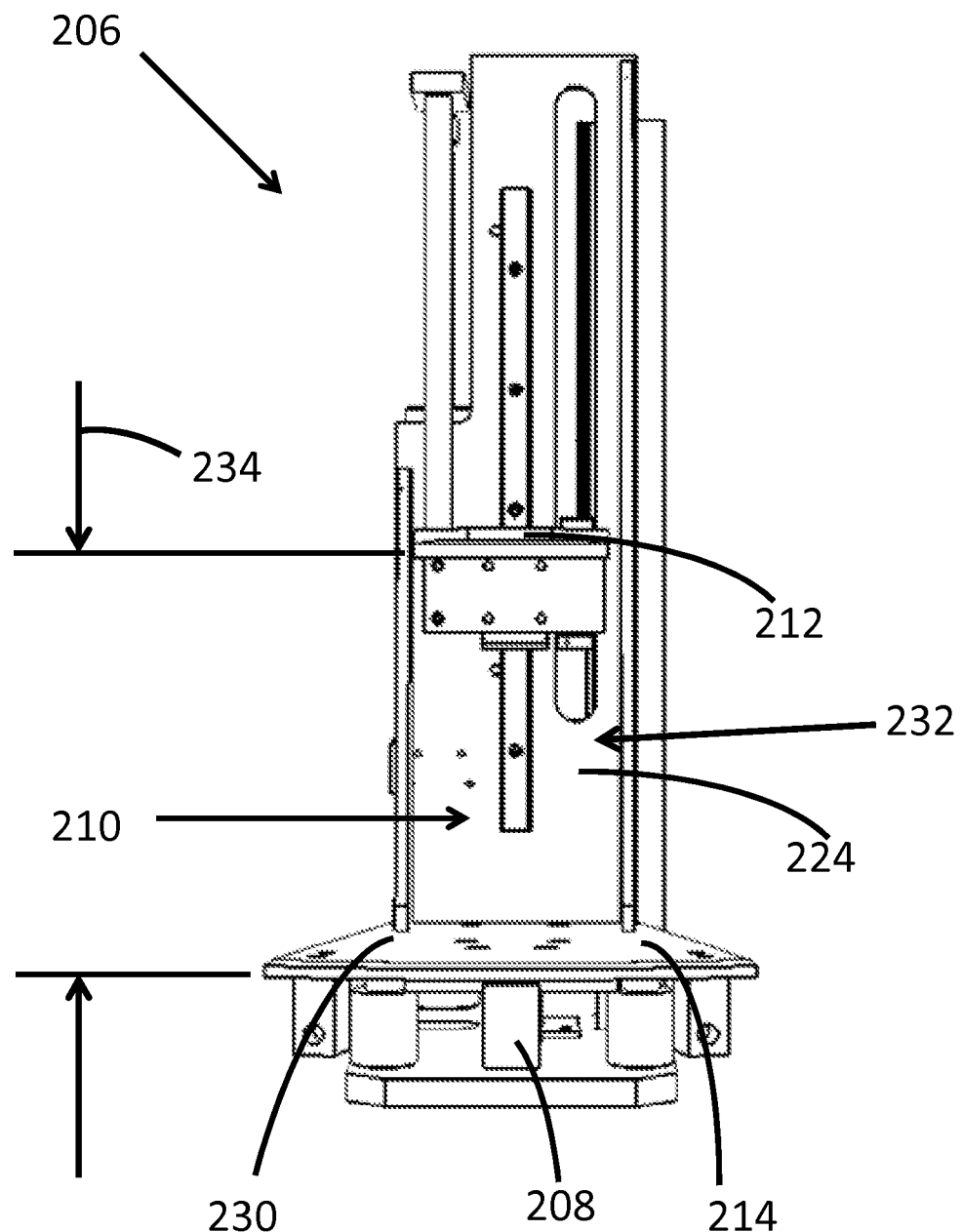
FIG. 6 is a front, elevation view of an exemplary weigh station of a checkweigher assembly connected with a portion of a frame.
Figure 7:
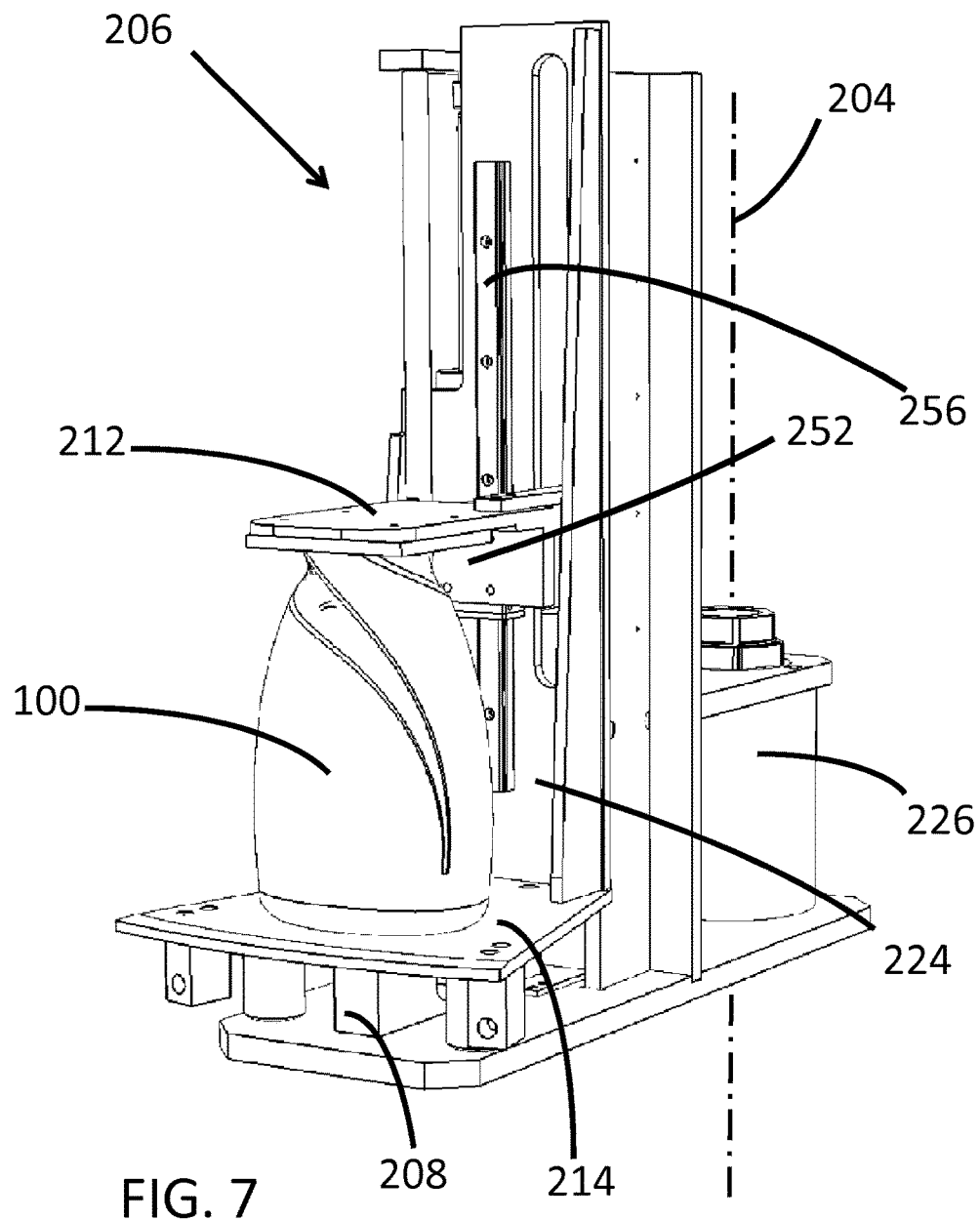
FIG. 7 is a side, elevation view of a portion of a checkweigher assembly, including a weigh station and a portion of a frame and drive shaft connected with the weigh station.

With reference to FIGS. 3, 6, and 7, the holder member 210 includes two grip members, shown as a top grip member 212 and a bottom grip member 214 for illustrative purposes only. In the claims, the top grip member 212 and the bottom grip member 214 may be referred to as a grip member, a first grip member, or a second grip member, depending on which grip member is recited first. The weight of the holder member 210, including the top and bottom grip members 212 and 214, is completely supported by the scale 208. The scale 208 can be tared with the holder member 210 connected with the scale 208 so that the scale 208 will only reflect the weight of the container. As a result, the accuracy of the weight measurement will not be negatively affected the holder member.

With reference to FIGS. 5 and 7, the holder member 210 is configured to hold a container 100 at the top and bottom periphery surfaces 102 and 104 of the container 100 as the frame 202 rotates the container 100 about the axis of rotation 204. As will be discussed in more detail below, little to no changeover parts are needed to weigh containers of various sizes, shapes, and configurations on the same checkweigher assembly 200.

Figure 8:
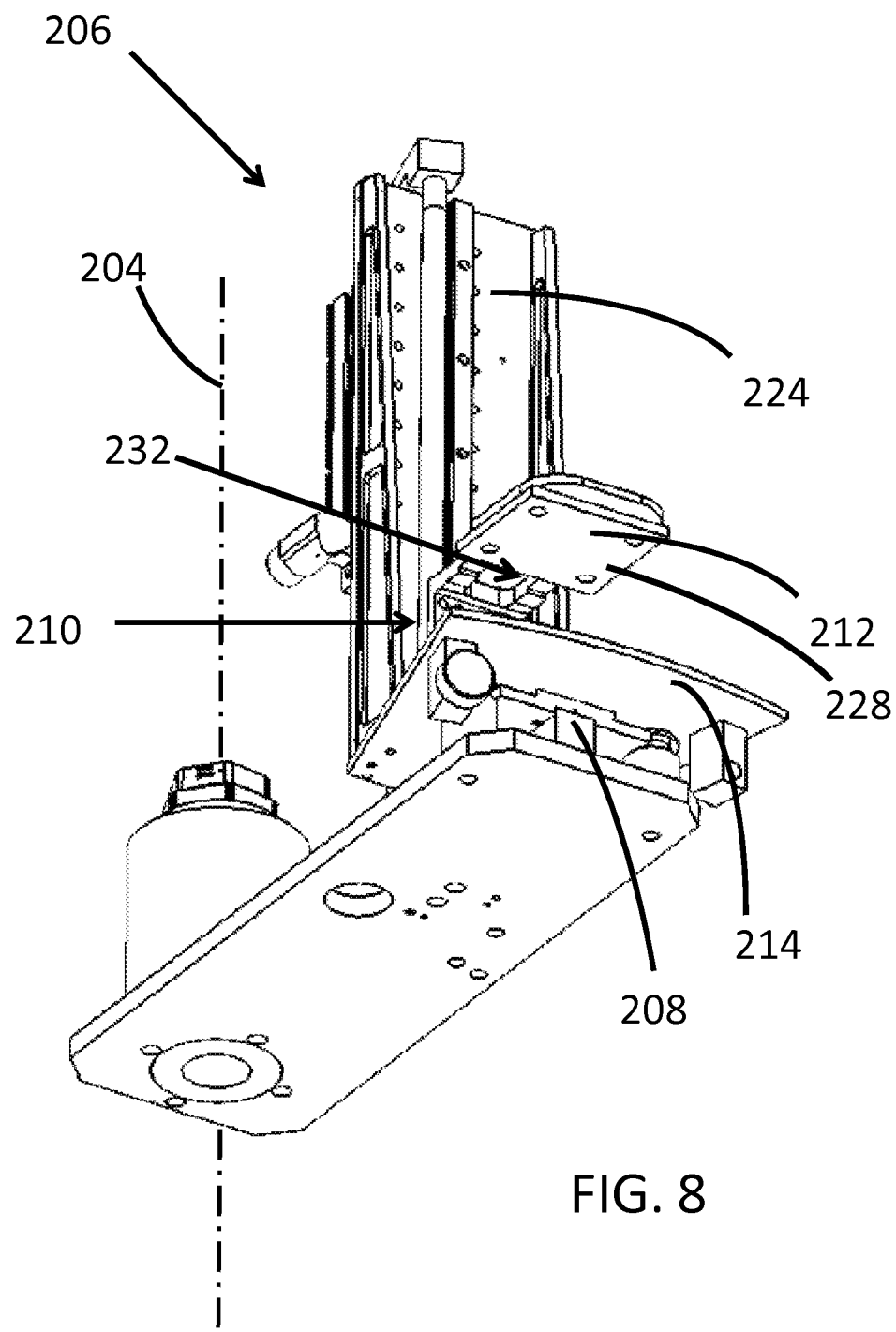
FIG. 8 is a bottom, perspective view of a portion of a checkweigher assembly and a container disposed thereon, including a weigh station and a portion of a frame and drive shaft connected with the weigh station.

With reference to FIGS. 3, 6, and 8, the top and bottom grip members 212 and 214 each have an outer surface 228 and 230, respectively. The outer surfaces 228 and 230 of the top and bottom grip members 212 and 214 are configured in a face-to-face relationship. The top grip member 212 is axially spaced from the bottom grip member 214 and a gap 232 is formed between the outer surfaces 228 and 230 of the top and bottom grip members 212 and 214. The gap 232 between the top and bottom grip members 212 and 214 is defined by a length 234. The outer surface 230 of the bottom grip member 214 is adapted to receive the bottom periphery surface of the container. The length 234 of the gap 232 may be increased in order to insert a container in the holder member 210 and may be decreased in order to hold a container between the top and bottom grip members 212 and 214 as the frame rotates in the about the axis of rotation. The length 234 of the gap 232 is also adjustable to accommodate containers of different heights.

With reference to FIG. 6, the top grip member 212 may be connected with the bottom grip member 214 by way of a support member 224. In the configuration shown in FIG. 6, the top grip member 212 may be movable relative to the bottom grip member 214 in order to adjust the length of the gap 232 between the top and bottom grip members 212 and 214. The top grip member 212 may be movable from a first position to a second position. In a first position, the gap 232 may be defined by a first minimum length. In a second position, the gap 232 may be defined by a second minimum length that is different from the first minimum length. The bottom grip member 214 may be stationary relative to the scale 208. However, it is to be appreciated that the bottom grip member 214 may be movable relative to the top grip member 212 and/or may be movable relative to the scale 208.

The checkweigher assembly also solves the container 100 stability concerns associated with current checkweigher apparatuses. With reference to FIGS. 1, 2, 6, and 8, by connecting the bottom grip member 214 with the scale 208 such that the bottom grip member 214 rotates with the connected scale 208, the container 100 is substantially stationary relative to the scale 208 while the scale 208 is actively taking a weight measurement of the container 100. The stability is further increased by holding the container 100 between the top and bottom grip members 212 and 214. Containers 100 having semi-rigid or flexible sidewall(s) 106 are often weaker at the sidewalls 106 than at the top and bottom periphery surfaces 102 and 104, and, thus, more likely to deform at the sidewalls 106 by forces acting on the container 100 in a direction orthogonal to the sidewalls 106 than by forces acting on the container 100 in a direction orthogonal to the top and bottom periphery surfaces 102 and 104 of the container 100. Therefore, by applying pressure in an axially downward direction to hold the container 100 with the top and bottom grip members 212 and 214, the possibility of the container 100 deforming, either temporarily or permanently, while advancing on the checkweigher assembly 200 are diminished.

The top and/or bottom grip members 212 and 214 of the holder member 210 may be configured to move axially relative to each other using various mechanisms. For example, with reference to FIGS. 9A-9C, the holder member 210 may include a cam 216 to adjust the position of the top grip member 212. The cam 216 includes a cam plate 217 having an outer surface 218 and a roller 219 that is operatively engaged with the outer surface 218 of the cam plate 217. The roller 219 is connected with a cam follower 220 that is connected with the top grip member 212. The roller 219 is configured to circumnavigate about a path 221 about the axis of rotation 204 in correspondence with the outer surface 218 of the cam plate 217. The axial position of a particular location on the path 221 of the outer surface 218 of the cam plate 217 can cause the roller 219, and, thus, the cam follower 220 and the top grip member 212, to move axially upward, move axially downward, or remain at the same axial position relative to the rotation axis 204 depending upon the previous axial position of the outer surface 218 of the cam plate 217 as the roller 219 circumnavigates about the cam plate 217. That is, as the roller 219 circumnavigates about the axis of rotation 204, a change in the axial position of the outer surface 218 of the cam plate 217 causes the roller 219, and, thus, the cam follower 220 and the top grip member 212, to change axial position in correspondence with the axial position of the outer surface 218 of the cam plate 217. The roller 219 may be movably, rotatably, or slideably engaged with the cam plate 217.

Figure 9A:
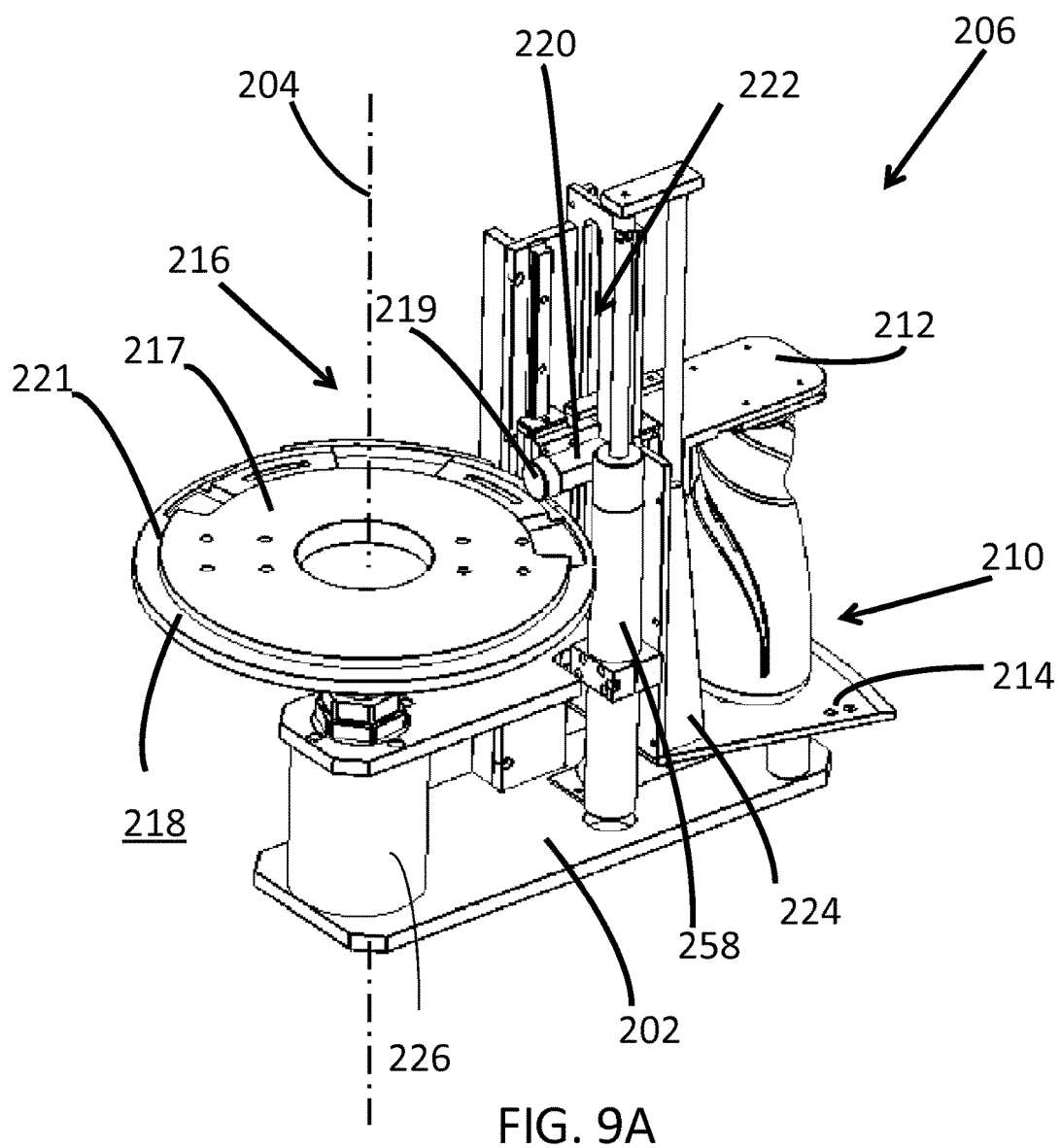
FIG. 9A is top, perspective view of a portion of a checkweigher assembly, including a weigh station and a portion of a frame, drive shaft, and cam connected with the weigh station. Portions of the checkweigher assembly, including elements that connect the cam to the frame have been removed to more clearly illustrate the cam and weigh station.
Figure 9B:
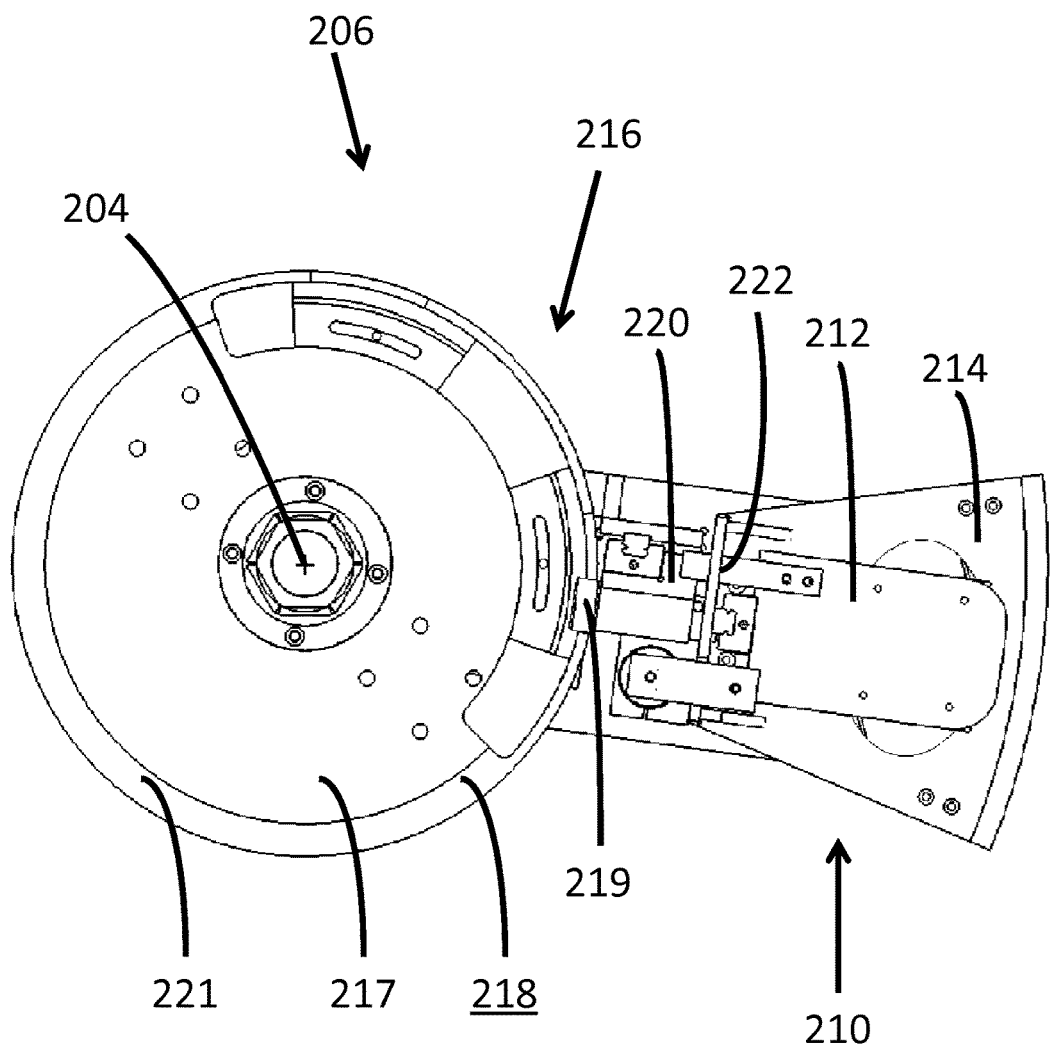
FIG. 9B is a top, plan view of a portion of a checkweigher assembly, including a weigh station and a portion of a frame, drive shaft, and cam connected with the weigh station.

In the example shown in FIGS. 9A and 9B, the cam follower 220 extends through an aperture 222 in the support member 224 and connects with the top grip member 212. As such, as the frame 202 rotates about the axis of rotation 204, the roller 219 circumnavigates on the cam plate 217, causing the axial position of the top grip member 212 to change with the roller 219 and the cam follower 220. Using a cam 216 provides an energy efficient mechanism for moving the top and/or bottom grip members 212 and/or 214 in an axial direction because the rotation of the drive shaft 226 of the checkweigher assembly 200 is used to move the top and/or bottom grip members 212 and/or 214 while also rotating the frame 202 about the axis of rotation 204.

Figure 9C:
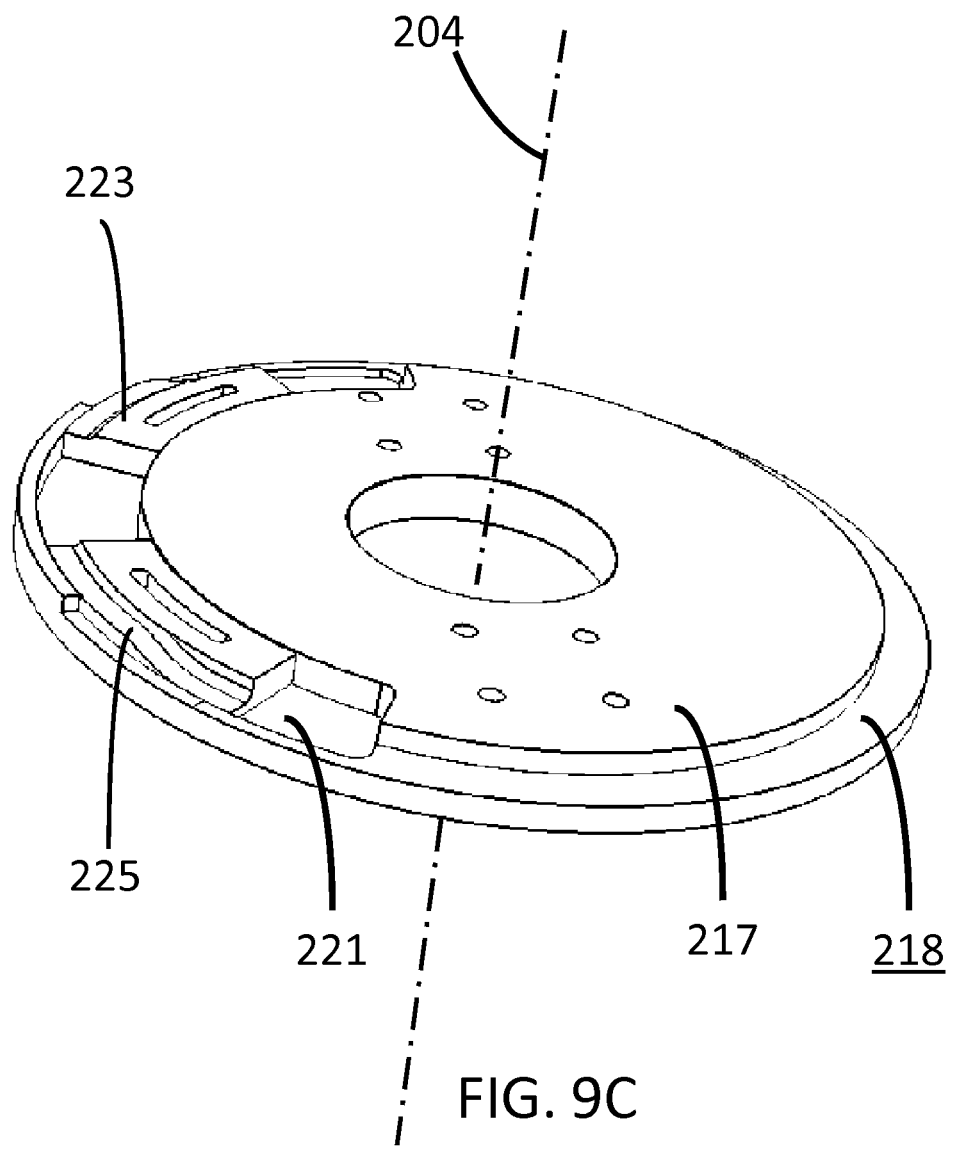
FIG. 9C is a top, perspective view of a cam plate.

As shown in FIG. 9C, the cam plate 217 may include one or more path members such as a first path member 223 and a second path member 225. The first and second path members 223 and 225 may be removably connectable with the cam plate 217. The first and second path members 223 and 225 may modify the outer surface 218 of the cam plate 217 such that the outer surface 218 has different axial positions at different locations around the path 221.

Figure 10:
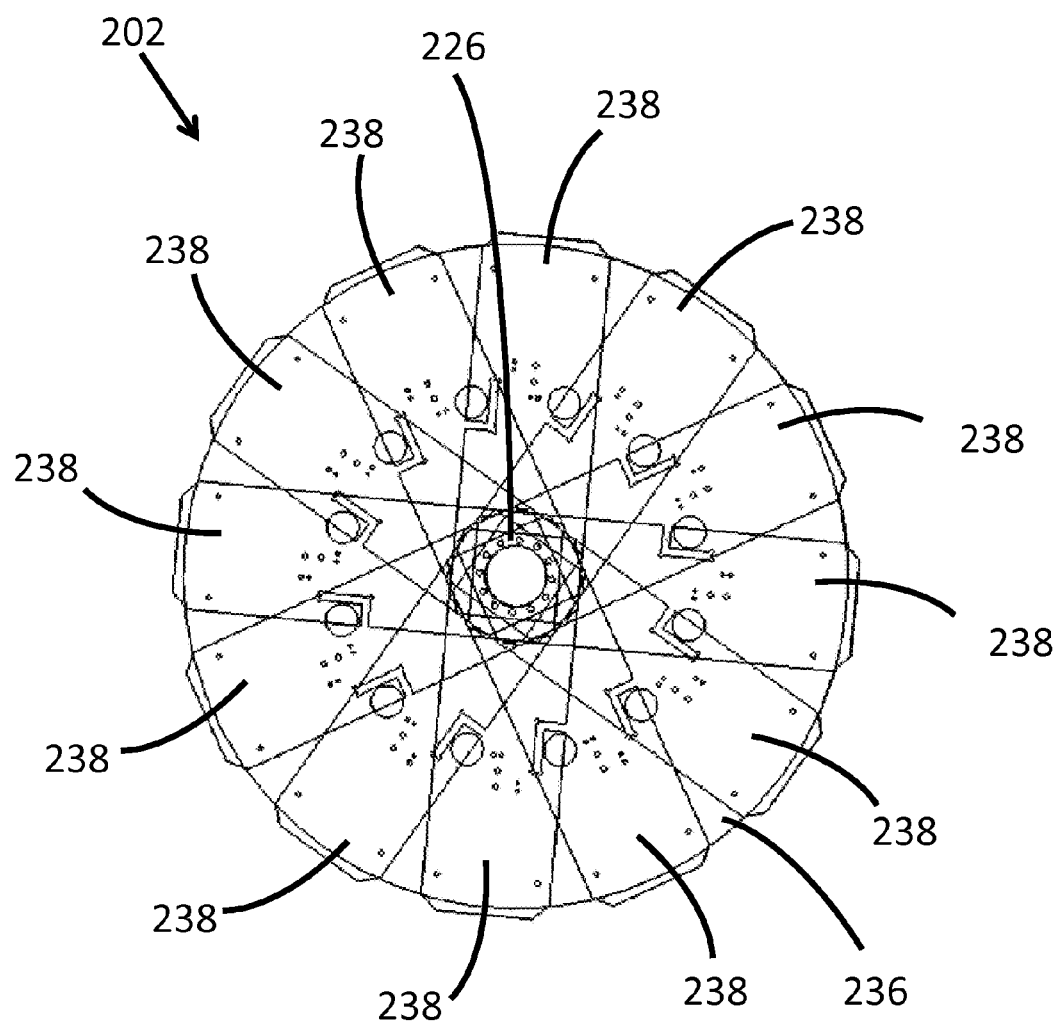
FIG. 10 is a top, plan view of a frame of a checkweigher assembly.

With reference to FIG. 10, the frame 202 may comprise a plate 236 and one or more base members 238 connected with the plate 236. It is to be appreciated that the frame 202 may be configured in various ways. For example, the plate 236 and the base member 238 may be a single unitary structure. The frame 202 may be configured with one or more base members 238 connected with the drive shaft 226 and may not include a plate that connects and/or supports the base members 238. The plate 236 may be a solid plate, or may comprise apertures to reduce material cost and/or to minimize the weight of the frame 202.

Figure 11:
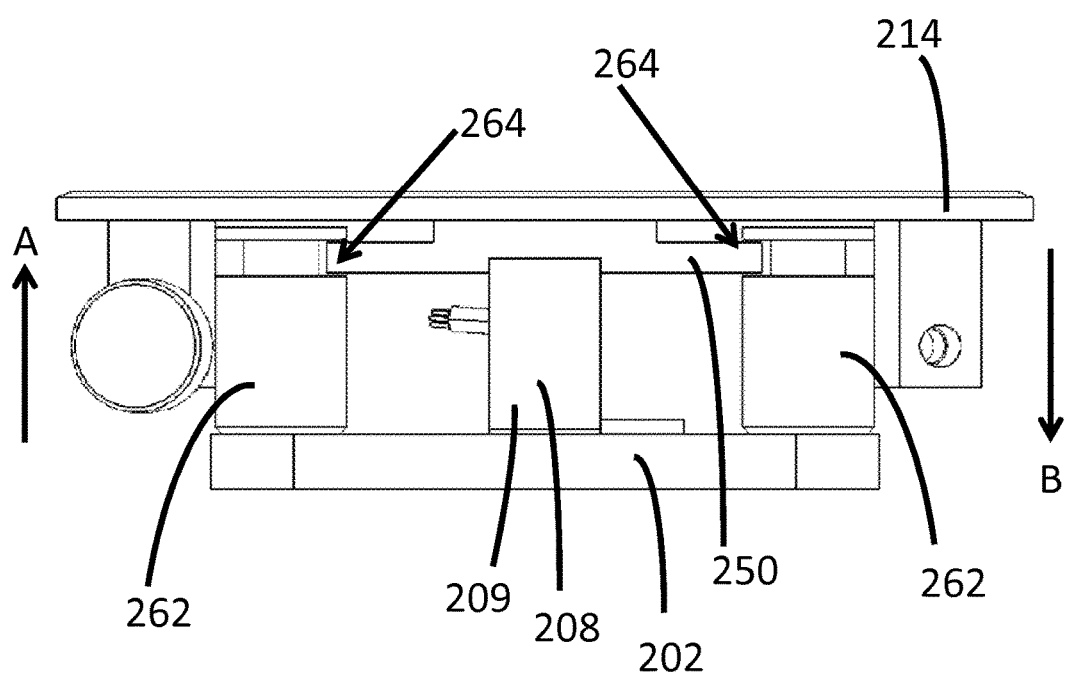
FIG. 11 is a front, elevation view of a portion of a checkweigher assembly, including a bottom grip member of a holder member, a scale, and a portion of a frame.
Figure 12:
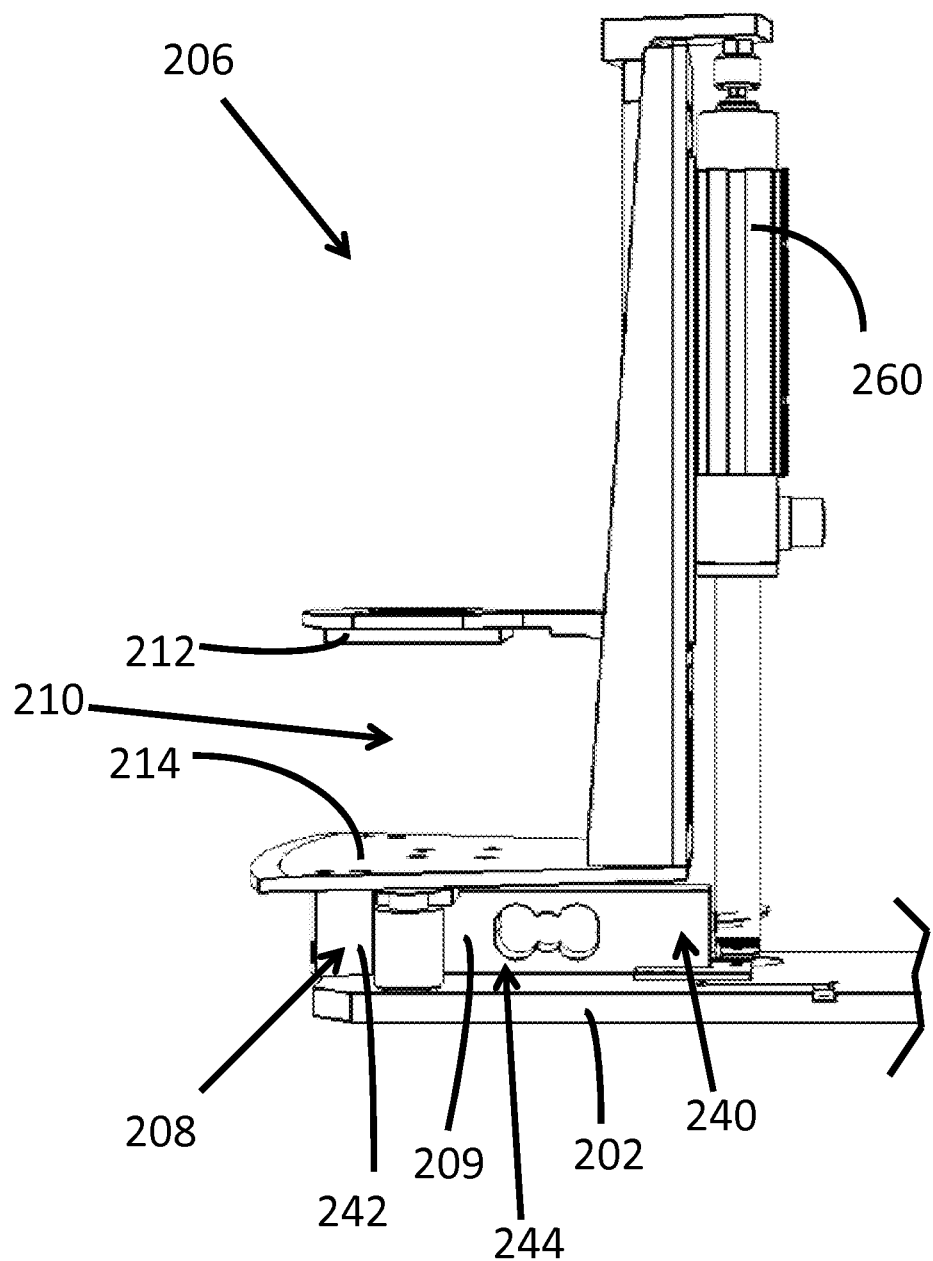
FIG. 12 is a side, elevation view of a portion of a checkweigher assembly, including a weigh station and a portion of a frame, drive shaft, and electric actuator connected with the weigh station.

With reference to FIGS. 6, 11, and 12, the scale 208 may be configured as a load cell 209. The load cell 209 may include a first end portion 240 and a second end portion 242 separated by a central portion 244. The first end portion 240 may be connected with the frame 202 at a bottom face 246 of the load cell 209. The second end portion 242 may be connected with a guide member 250 on a top face 248 of the load cell 209, while the second end portion 242 is movable relative to the frame 202. As such, as a container is positioned on the bottom grip member 214, the weight of the container forces the second end portion 242 of the load cell 209 axially downward in direction B. When the container is removed from the bottom grip member 214, the second end portion 242 of the load cell 209 moves axially upward in direction A. Various load cells may be used. An exemplary load cell includes MT1041, a strain-gauge based load cell, from Mettler Toledo. While it is shown in FIGS. 6, 11, and 12 that the scale may be configured as a load cell, it is to be appreciated that different types of scales may be used. For example, the scale may be configured as magnetic load cell. Load cells provide the benefits of high accuracy and a fast measurement response.

The top grip member may be configured in many different ways. With reference to FIGS. 6 and 7, the top grip member 212 may be operatively connected with the support member 224. The top grip member 212 may be movably or slideably engaged with the support member 224. As shown in FIG. 7, the top grip member 212 may be slideably engaged with the support member 224 using a guide block 252 connected with a track 256. The top grip member 212 can have different shapes. For example, the top grip member 212 can be square, as shown in FIG. 7 for exemplary purposes only, or the top grip member 212 can be arcuate, substantially circular, substantially rectangle, or the like. However, it is to be appreciated that the top grip member 212 may have various shapes and may be connected with the support member 224 in various ways.

The top grip member may have various dimensions. The outer surface 228 of the top grip member 212 may be configured to be larger than the top periphery surface of the largest container to be weighed on the weigh station 206.

With reference to FIGS. 6 and 7, the top grip member 212 may be composed of different materials. For example, the top grip member 212 may be comprised of metal, a polymeric material, including rigid or flexible polymeric materials, or combinations thereof. The top grip member 212 may include a layer of rigid material such as metal and a layer of deformable material. The deformable material may include rubber or foam, for example. The deformable material may be disposed between the metal layer and the container 100, such that the deformable material compresses as the top grip member 212 applies pressure in an axially downward direction to the container 100. The friction force between the deformable material and the top periphery surface 102 of the container 100 may assist the container in remaining stationary on the weigh station 206 as the container 100 is being weighed, which may, in turn, positively impact the accuracy of the weight measurement. Moreover, having a deformable material at the outer surface 228 of the top grip member 112 may assist in gripping a container 100 that has a top periphery surface 102 that is not flat or substantially flat.

The bottom grip member may be configured in many different ways. With reference to FIGS. 6 and 7, the bottom grip member 214 may be fixedly connected with the support member 224. However, it is to be appreciated that the bottom grip member 214 may be operatively, movably, or slideably connected with the support member 224. The bottom grip member 214 is also connected with the scale 208. The bottom grip member 214 acts as a support surface for a container that is to be weighed by the weigh station 206. The bottom grip member 214 may be sufficiently rigid to support the container, support member 224, and/or the various elements connected with the support member 224, while providing a stable surface for the container to be disposed upon. The bottom grip member 214 may have various dimensions. The outer surface 230 of the bottom grip member 214 may be configured to be larger than the largest bottom periphery surface of a container to be weighed on the weigh station 206. The bottom grip member 214 may have various thicknesses.

The bottom grip member 214 may be composed of various materials, such as metal or a rigid polymeric material. The bottom grip member 214 may be composed of a single material, or may be composed of a combination of materials, such as metal and a rigid polymeric material. The material may be chosen based upon the coefficient of friction between the material of the container 100 and the material of the outer surface 230 of the bottom grip member 214. Since the container 100 to be weighed on the weigh station 206 is inserted and removed from the bottom grip member 214 at a relatively high rate of speed, the coefficient of friction between the container 100 and the bottom grip member 214 can affect the transfer of the container 100 into and out of the weigh station 206. The coefficient of kinetic friction may be sufficiently low so that the container 100 may be inserted onto the bottom grip member 214 with relative ease, while at the same time the coefficient of kinetic friction may be sufficiently high so that the container 100 does not slide off of the bottom grip member 214 as it is inserted onto the bottom grip member 214. Moreover, the coefficient of static friction may be sufficiently high so that the container 100 will remain stationary relative to the outer surface 230 of the bottom grip member 214 as centripetal acceleration acts on the container 100 as the frame rotates the weigh station 206 about the axis of rotation 204.

As shown in FIG. 6, the support member 224 may be configured as a substantially rectangular or elongate structure that extends axially from the bottom grip member 214 toward the top grip member 212. The support member 224 may have various shapes and may be composed of various materials. For example, the support structure 224 may be composed of metal.

As shown in FIG. 9A, the weigh station may include a spring 258 to control the pressure applied to the container by the top grip member. In the example configuration shown in FIG. 9A, the spring 258 may be configured as a magnetic spring. The magnetic spring has the advantage of providing a constant force over the full operating range of motion unlike a conventional mechanical spring that provides varying force based upon the compression of the spring. Moreover, magnetic springs are passive devices that do not require electrical or pneumatic power to function. An exemplary magnetic spring includes LinMot Mag spring, model M01-37x305/275.

While it is shown in FIGS. 9A and 9B that a cam 216 can be used to adjust the axial position of the top grip member 212, the position of the top grip member 212 may be adjusted in various other ways. For example, with reference to FIGS. 12 and 13, the holder member 210 may include an electric actuator 260 to electrically adjust the axial position of the top grip member 212 of the holder member 210. The electric actuator 260 may be configured as a linear actuator with a servo drive. Exemplary linear actuators include LinMot PS01-37x120E-HP-C and PL01-20x400/340-HP. However, it is to be appreciated that various actuators may be used, including rotary servo motors connected with ball screws, belts, chains, crank sliding mechanisms, or various other transmissions. While the electric actuator 260 is controlled with a servo drive, it is to be appreciated that various other drive systems may be used, such as pneumatic cylinders, hydraulic cylinders, solenoids, etc. The electric actuator 260 can control the amount of pressure applied to a container by the top grip member 212. Using a servo-driven electric actuator, the pressure applied to the container by the top grip member 212 can be modified without having to change out any parts.

As discussed above, and with reference to FIGS. 7, 9, and 13, pressure may be applied in an axially downward direction to the container 100 to hold the container 100 between the top and bottom grip members 212 and 214 using either the spring 258 as shown in FIG. 9 or the electric actuator as shown in FIG. 13. The pressure applied to the top periphery surface 102 of the container 100 may be in the range of about 10 Newtons to about 80 Newtons. The pressure should be sufficient to keep the container 100 stationary between the top and bottom grip members 212 and 214 as the weigh station 206 rotates the container 100 about the axis of rotation and causes the container 100 to experience the effects of centripetal acceleration. The centripetal acceleration experienced by the container 100 may be in the range of about 0.05 g to about 1.0 g, or in the range of about 0.2 g to about 1.0 g. However, the pressure should also be low enough to diminish the likelihood of the container 100 being temporarily or permanently deformed by the top grip member 212 applying pressure to the container 100. The pressure may be adjusted based on the desired throughput rate for a particular process and/or based upon the particular container 100 that is being weighed.

While it is shown in FIGS. 6-9 and 12-13 that the top grip member 212 is movable in an axial direction relative to the bottom grip member 214 and the scale 208 and the bottom grip member 214 is stationary relative to the scale 208, it is to be appreciated that the bottom grip member 214 may be configured to move in an axial direction as well as, or instead of, the top grip member 212. The bottom grip member 214 may be configured to move in an axial direction using similar mechanisms used to axially move the top grip member 212, including cams 216 and/or electric actuators 260.

The weigh station may be configured to prevent overloading of the scale through excessive deflection, which can lead to inoperability of the scale. With reference to FIGS. 11 and 12, the weigh station 206 may comprise one or more stop members 262 engaged with the guide member 250. The guide member 250 may be connected with both the scale 208 and the bottom grip member 214. The stop member 262 shown in FIG. 11 includes a side notch 264 and the guide member 250 is engaged with the side notch 264 of the stop member 262. The guide member 250 is able to move in an axial direction when a load is applied to the bottom grip member 214. However, the stop members 262 act to limit the axial, rotational, and side-to-side movement of the guide member 250, which in turn limits the force that can be applied to the scale 208 to prevent the scale 208 from being overloaded. In the exemplary configuration shown in FIG. 11, the weigh station 206 comprises two stop members 262. However, one or more stop members 262 may be used. Instead of the guide member 250 and stop members 262, it is to be appreciated that various other mechanisms may be used to prevent overloading of the scale 208. For example, linear bearings or four-bear mechanisms may be used to isolate deflection of the load cell to a single-axial direction, preventing scale damage from moment or side loads.

Figure 13:
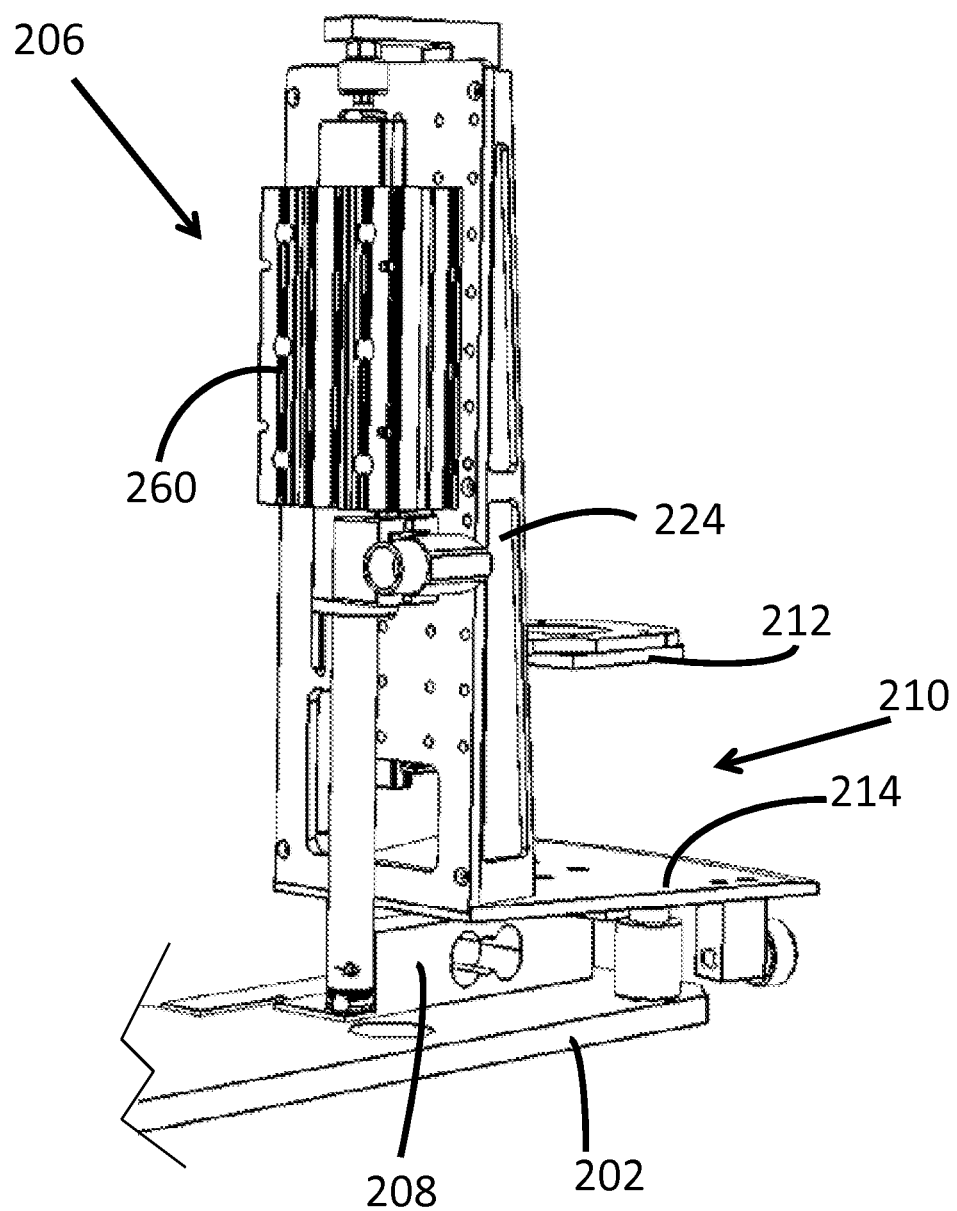
FIG. 13 is a side, perspective view of a portion of a checkweigher assembly, including a weigh station and a portion of a frame, drive shaft, and electric actuator connected with the weigh station.

With continued reference to FIGS. 12 and 13, the weigh station 206 may be configured to be relatively light weight in order to limit the amount of weight that is supported by the scale 208. For example, the mass of an individual weigh station 206 may be less than about 10 kilograms, or less than about 5 kilograms. Minimizing the mass of an individual weight station 206 in turn minimizes the amount of weight that the scale 208 needs to support. This may increase the life of the scale 208 and/or reduce the maintenance required on the scale 208. Using an electric actuator 260 to move the top and/or bottom grip members may help minimize the mass of the weigh station 206 because the number of elements supported by the scale 208 is minimized with the electric actuator 260.

Figure 14:
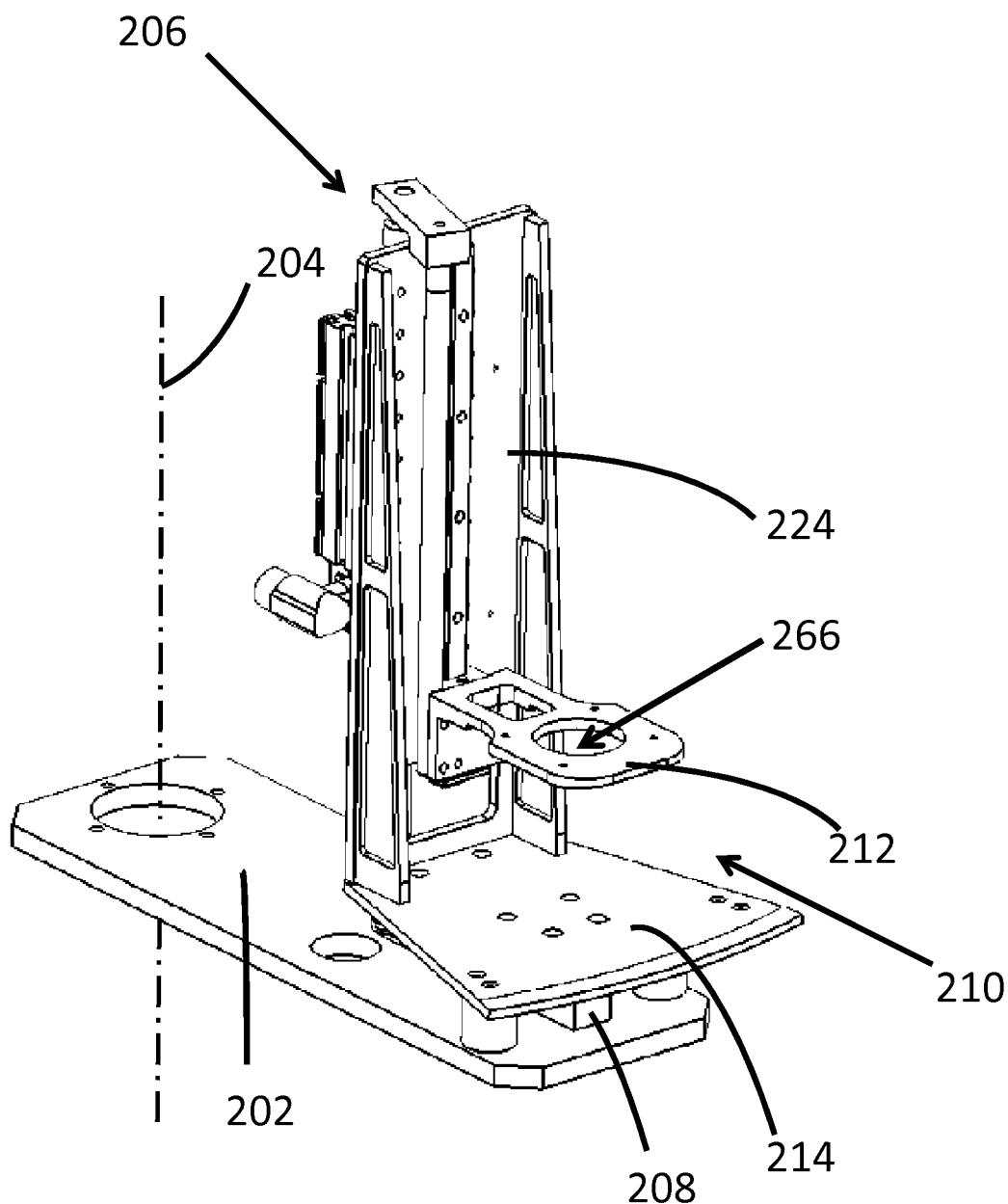
FIG. 14 is top, perspective view of a portion of a checkweigher assembly having a top grip member with an aperture.
Figure 15:
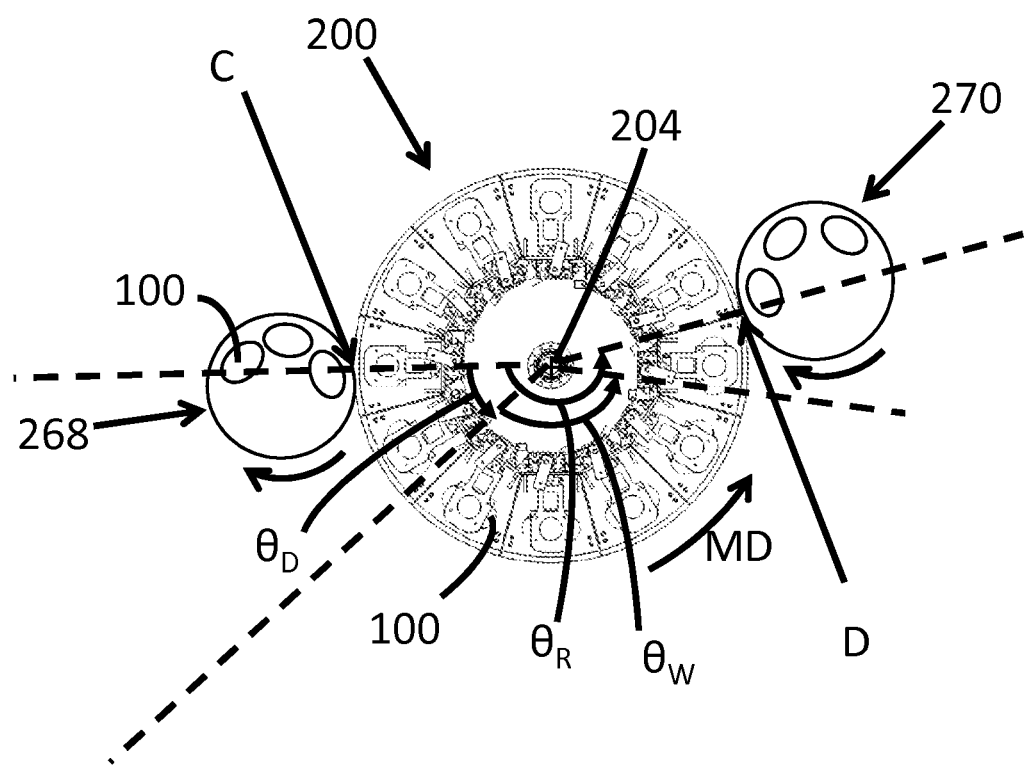
FIG. 15 is a schematic, top plan view of a first carrier apparatus, a checkweigher assembly, and a second carrier apparatus.

With reference to FIG. 14, the top grip member 212 may be configured with an aperture 266 to allow the top grip member 212 to move axially downward onto a container until the aperture 266 surrounds a portion of the sidewall(s) the container. The aperture 266 may be shaped to match the shape of a portion of the sidewall of the container to limit movement of the container as the weigh station 206 rotates the container about the axis of rotation 204. As discussed above, conventional rotary apparatuses for advancing containers may utilize gripper arms to hold the container at the sidewalls to prevent movement of the container as the rotary device rotates about an axis of rotation. A top grip member 212 such as shown in FIG. 14 solves this problem because the top grip member 212 does not apply a compressive force to the sidewalls of the container, but instead limits radial or circumferential movement of the container as the weigh station 206 rotates about the axis of rotation 204.

The holder member may include one or more fingers that are configured to hold the container at the sidewalls. The finger(s) may be supported by the scale. The fingers may be retractable or may be configured to move circumferentially, radially, or combinations thereof in order to grip the sidewall of the container. The fingers may be used in combination with the top and bottom grip members to hold the container in place.

In operation, with reference to FIGS. 1-7 and 15, the drive shaft 226 rotates about the axis of rotation 204, causing the frame 202 to also rotate about the axis of rotation 204. A container 100 advances in a machine direction MD from a first carrier apparatus 268 to the checkweigher assembly 200. The first carrier apparatus 268 may be configured to perform one or more operations to the container 100. For example, the first carrier apparatus 268 may advance the container 100 from a filling and/or capping station to the checkweigher assembly 200. In another example, the first carrier apparatus 268 may install a lid on the reservoir of the container 100 before advancing the container 100 to the checkweigher assembly 200. The first carrier apparatus 268 may be configured as a linear or arcuate conveyor or a starwheel, for example.

As the container 100 advances toward the checkweigher assembly 200, the top grip member 212 of weigh station 206 that is configured to receive the advancing container 100 is axially positioned such that the gap 232 is defined by a length 234 that is longer than the height 108 of the container 100. As such, the container 100 can be inserted onto the bottom grip member 214 without the top grip member 212 restricting movement of the container 100. For example, the length 234 of the gap 232 may be in the range of about 1 mm to about 10 mm longer than the height 108 of the container 100.

From the first carrier apparatus 268, the container 100 advances onto the bottom grip member 214 of the weigh station 206 that is positioned adjacent to the first carrier apparatus 268 as the container 100 advances in the machine direction MD to the checkweigher assembly 200. The point of transfer of the container from the first carrier apparatus to the checkweigher assembly is shown as point C in FIG. 15. The drive shaft 226 and frame 202 continuously rotate about the axis of rotation 204 as the container 100 advances onto the bottom grip member 214. Once the container 100 is positioned on the outer surface 230 of the bottom grip member 214, the top grip member 212 may be moved in an axial direction toward the container 100 until the outer surface 228 of the top grip member 212 is in contact with the top periphery surface 102 of the container 100 and a predetermined amount of force is applied to the top periphery surface 102 of the container 100 by the top grip member 212. It is to be appreciated that the top grip member 212 may be simultaneously moved axially toward the container 100 as the container 100 advances onto the bottom grip member 214 in order to minimize the amount of time that the container 100 advances on the bottom grip member 214 unrestricted from movement by the top and bottom grip members 212 and 214. The angle of rotation from the time the container 100 advances onto the bottom grip member 214 until the top grip member 212 contacts the container 100 may be in the range of about 1 degree to about 10 degrees.

The container 100 may advance on the weigh station 206 for a predetermined dwell time, measured by an angle of rotation $\theta_D$, to allow any vibrations imparted into the scale during the transfer of the container 100 onto the weigh station 206 to dissipate. The angle of rotation $\theta_D$ about the axis of rotation 204 may be in the range of about 30 degree to about 90 degrees, for example.

Once the weigh station 206 rotates beyond the predetermined angle of rotation $\theta_D$, the scale 208 is used to measure the weight of the container 100. The weight measurement may occur over an angle of rotation $\theta_W$. For example, the weight may be analyzed over an angle of rotation $\theta_W$ of about 90 degrees to about 160 degrees. The weight measurement may take about 100 milliseconds to about 200 milliseconds. The weight measurement may be stored in a computer. The weight measurement may be transmitted to a monitor to be viewed in real-time during the packaging process. The weight measurement may provide a level of accuracy down to 1 gram on a 2 kilogram container.

Once the weigh measurement of the container 100 is complete, the container 100 may be removed from the weigh station 206 and the container 100 may advance onto a second carrier apparatus 270. Prior to removing the container 100 from the weigh station 206, the top grip member 212 may be moved axially away from the container 100 so that the container 100 is unrestricted from movement. Before the container 100 is removed from the bottom grip member 214, the gap 232 between the outer surfaces 228 and 230 of the top and bottom grip members 212 and 214 may be positioned such that the length 234 of the gap 232 is greater than the height 108 of the container 100. The point of transfer of the container from the checkweigher assembly 200 to the second carrier apparatus 270 is shown as point D in FIG. 15.

From point C to point D, the weigh station 206 may rotate by various angles of rotation $\theta_R$. For example, the angle of rotation $\theta_R$ from pickup of the container 100 to drop-off of the container by the checkweigher assembly 200 may be in the range of about 90 degrees to about 300 degrees.

It is to be appreciated that more than one weigh station 206 may be performing a portion of the weighing step on separate objects at the same time. Stated in another way, as each weigh station 206 rotates through the weight measurement phase of the rotation over the angle of rotation $\theta_W$, each weigh station 206 is capable of weighing a separate object. At any given time, each weigh station 206 that is actively weighing an object may be performing the same or different steps of the weight measurement process. For example, one weigh station 206 may be measuring the weight of an object while another weigh station 206 may have just completed the weight measurement of an object and may be actively recording the weight measurement, while at the same time another weigh station 206 may just be actively starting the weight measurement. As a result, the checkweigher assembly is able to weigh multiple objects at the same time, resulting in a relatively high throughput of weight measurements.

The rate at which the checkweigher assembly 200 may weigh objects such as containers 100 may be greater than about 100 containers per minute, or greater than about 200 containers per minute, or greater than about 300 containers per minute, or greater than 350 containers per minute, or greater than 400 containers per minute.

The second carrier apparatus 270 may be configured in various ways. For example, the second carrier apparatus 270 may transport the container 100 from the checkweigher assembly 200 to a downstream process. The second carrier apparatus 270 may be configured to package the container 100 in a shipping receptacle, for example. The second carrier apparatus 270 may be configured as a curved conveyor, a linear conveyor, a starwheel, or the like.

The first and/or second carrier apparatuses may be advancing the container at the same surface velocity as the checkweigher assembly, or may be advancing the container at a different surface velocity than the checkweigher assembly.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present disclosure have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method of weighing an object on a checkweigher assembly, wherein the checkweigher assembly comprises a frame that is rotatable about an axis of rotation and a scale operatively connected with the frame, the checkweigher assembly further comprises top and bottom grip members, wherein the top and bottom grip members are axially spaced apart from each other and are operatively connected with and substantially supported by the scale, the top and bottom grip members each have an outer surface, wherein the outer surfaces of the top and bottom grip members are arranged in a face-to-face relationship and form a gap therebetween defined by a length, wherein the length of the gap is adjustable, the method comprising the steps of:

advancing an object in a machine direction, the object having a top periphery surface and a bottom periphery surface, wherein the object is defined by a height extending from an outermost point of the top periphery surface to an outermost point of the bottom periphery surface;

rotating the frame of the checkweigher assembly in a machine direction about the axis of rotation;

configuring the gap between the outer surfaces of the top and bottom grip members to a first length that is greater than the height of the object;

positioning the bottom periphery surface of the object on the outer surface of the bottom grip member;

adjusting the gap between the outer surfaces of the top and bottom grip members until the top and bottom grip members contact the object;

weighing the object;

adjusting the gap between the outer surfaces of the top and bottom grip members to a second length that is greater than the height of the object; and removing the object from the bottom grip member.

2. The method of claim 1, wherein the top grip member is movable in the axial direction relative to the bottom grip member.

3. The method of claim 1, wherein the step of rotating the frame of the checkweigher assembly in a machine direction about the axis of rotation includes continuously rotating the frame of the checkweigher assembly.

4. The method of claim 1, wherein the object is a container.

5. The method of claim 1, wherein the top and bottom grip members are fully supported by the scale.

6. The method of claim 1, wherein the object experiences a centripetal acceleration in the range of about 0.05 g to about 1.0 g.

7. The method of claim 1, wherein the step of weighing the object includes weighing the object as the frame rotates about the axis of rotation.

8. The method of claim 1, wherein the checkweigher assembly comprises at least two scales, wherein each scale is operatively connected with a set of top and bottom grip members, the method further comprising the step of simultaneously performing a portion of the weighing step on a first object with a first scale and performing a portion of the weighing step on a second object with a second scale.

9. A method of weighing an object having a variable height on a checkweigher assembly, the checkweigher assembly comprising a frame that is rotatable about an axis of rotation, a scale operatively connected with the frame, and first and second grip members operatively connected with the frame, wherein the first and second grip members are substantially supported by scale, the method comprising the steps of:
providing an object having a top periphery surface and a bottom periphery surface;
rotating the frame in a machine direction about an axis of rotation;
positioning the object on the second grip member;
applying pressure to the object in an axially downward direction using the first grip member;
weighing the object using the scale as the frame rotates about the axis of rotation; and
removing the object from the second grip member.

10. The method of claim 9, wherein the first grip member is a top grip member and the second grip member is a bottom grip member, wherein the top grip member is movable in the axial direction relative to the bottom grip member.

11. The method of claim 9, wherein the object is a container.

12. The method of claim 9, wherein the top and bottom grip members are fully supported by the scale.

13. The method of claim 9, wherein the object experiences a centripetal acceleration in the range of about 0.05 g to about 1.0 g.

14. The method of claim 9, wherein the checkweigher assembly comprises at least two scales and at least two first and second grip members, wherein each scale is operatively connected with a different first and second grip member.

15. The method of claim 9, wherein the checkweigher assembly is configured to weigh objects having different heights.

16. A checkweigher assembly capable of simultaneously weighing one or more objects, the checkweigher assembly comprising:
a frame rotatable about an axis of rotation;
a scale operatively connected with the frame; and
a holder member operatively connected with the scale, wherein the weight of the holder member is substantially supported by the scale, wherein the holder member comprises:
a first grip member having an outer surface; and
a second grip member having an outer surface,
wherein the first grip member is axially spaced from the second grip member forming a gap therebetween, wherein the outer surface of the first grip member is in a face-to-face relationship with the outer surface of the second grip member,
wherein the first grip member is movable from a first position to a second position, wherein the gap is defined by a first minimum length when the first grip member is in the first position, wherein the gap is defined by a second minimum length when the first grip member is in the second position, wherein the first minimum length is greater than the second minimum length,
wherein the second grip member is movable relative to the first grip member and wherein the first grip member is movable relative to the second grip member; and
wherein the second grip member is connected to the scale such that the second grip member rotates with the connected scale.

17. The assembly of claim 16, wherein the checkweigher assembly comprises at least two scales, wherein each scale is operatively connected with a separate holder member, wherein the assembly is configured such that a first scale actively weighs a first object as a second scale actively weighs a second object.

18. The assembly of claim 16, wherein the first grip member is a top grip member and the second grip member is a bottom grip member, wherein the top grip member is movable in the axial direction relative to the bottom grip member.

19. The assembly of claim 16, wherein the assembly comprises no more than 12 scales.

20. The assembly of claim 17, wherein the weight of the holder member is fully supported by the scale.

* * * * *